(12) United States Patent
Lee et al.

(10) Patent No.: US 7,391,165 B2
(45) Date of Patent: Jun. 24, 2008

(54) DISCHARGE LAMP LIGHTING CONTROL DEVICE

(75) Inventors: Fred C. Lee, Blacksburg, VA (US);
Jinghai Zhou, Santa Clara, CA (US);
Yan Jiang, Blacksburg, VA (US);
Masanao Okawa, Woburn, MA (US);
Dung A. Tran, Wakefield, MA (US);
Hiroyasu Eriguchi, Lexington, MA (US)

(73) Assignees: Matsushita Electric Works, Ltd., Osaka (JP); Virginia Tech Intellectual Properties, Inc., Blacksburg, VA (US)

( * ) Notice: Subject to any disclaimer, the term of this patent is extended or adjusted under 35 U.S.C. 154(b) by 5 days.

(21) Appl. No.: 10/553,846

(22) PCT Filed: Apr. 22, 2004

(86) PCT No.: PCT/US2004/010963

§ 371 (c)(1),
(2), (4) Date: Oct. 20, 2005

(87) PCT Pub. No.: WO2004/095668

PCT Pub. Date: Nov. 4, 2004

(65) Prior Publication Data

US 2006/0279230 A1 Dec. 14, 2006

Related U.S. Application Data

(60) Provisional application No. 60/464,646, filed on Apr. 23, 2003.

(51) Int. Cl.
*H05B 41/16* (2006.01)

(52) U.S. Cl. .................. 315/247; 315/224; 315/291; 315/307; 315/274

(58) Field of Classification Search .................. 315/247, 315/246, 291, 307–309, 224, 225, 209 R, 315/274, 276–279, 312, 324
See application file for complete search history.

(56) References Cited

U.S. PATENT DOCUMENTS 5,598,326 A  1/1997  Liu et al.

(Continued)

FOREIGN PATENT DOCUMENTS

JP  10-294188  4/1998

(Continued)

OTHER PUBLICATIONS

English Language Abstract of JP 10-294188.

(Continued)

*Primary Examiner*—Tuyet Vo
(74) *Attorney, Agent, or Firm*—Greenblum & Bernstein, P.L.C.

(57) ABSTRACT

A discharge lamp lighting control device (100) having a DC power converter, a power factor improving power converter (1), a polarity reversing circuit (2), a starter circuit (3), and a controller (4). The power factor improving power converter 1 includes a switching device S, a power factor improver, and a power converter. The power factor improver operates to smooth a rectified voltage by storing energy in a first inductive device L1 and by discharging energy from a second inductive device L2, in which the first and second inductive devices are magnetically coupled together. The storing and discharging is performed by turning ON and OFF the switching device S. A predetermined DC voltage is converted by energy stored and discharged by a third inductive device L3 in response to the turning ON and OFF of the switching device S.

26 Claims, 17 Drawing Sheets

U.S. PATENT DOCUMENTS

| | | |
|---|---|---|
| 5,907,223 A | 5/1999 | Gu et al. |
| 5,932,976 A | 8/1999 | Maheshwari et al. |
| 5,942,859 A | 8/1999 | Okude et al. |
| 5,962,981 A | 10/1999 | Okude et al. |
| 6,034,489 A | 3/2000 | Weng |
| 6,426,597 B2 | 7/2002 | Rast et al. |
| 6,593,703 B2 | 7/2003 | Sun |
| 6,670,779 B2 | 12/2003 | Shen |
| 6,963,176 B2 | 11/2005 | Onishi et al. |
| 2003/0034744 A1* | 2/2003 | Toyama ............... 315/291 |
| 2004/0113567 A1* | 6/2004 | Yamauchi et al. ........... 315/291 |
| 2004/0183473 A1* | 9/2004 | Kamoi et al. ............... 315/291 |

FOREIGN PATENT DOCUMENTS

| | | |
|---|---|---|
| JP | 10-294186 | 11/1998 |
| JP | 10-294189 | 11/1998 |
| JP | 10-294191 | 11/1998 |

OTHER PUBLICATIONS

English Language Abstract of JP 10-294191.
English Language Abstract of JP 10-294186.
English Language Abstract of JP 10-294189.

\* cited by examiner

DISCHARGE LAMP LIGHTING CONTROL DEVICE

This application claims the benefit of U.S. Provisional Application No. 60/464,646 filed on Apr. 23, 2003, the subject matter of which is expressly incorporated herein by reference.

BACKGROUND OF THE INVENTION

1. Field of the Invention

The present invention is directed to a high intensity discharge (HID) lamp driving circuit, and in particular, to a power factor improving power converter (PFIPC) for use with the HID lamp driving circuit.

2. Discussion of Background and Other Information

Electronic lighting control devices for use with HID lamps are known in the art. Examples of such devices include, for example, U.S. Pat. No. 5,942,859 (corresponding to Japanese Laid-Open Patent Application Nos. HEI 10-294188 and HEI 10-294191); U.S. Pat. No. 5,962,981 (corresponding to Japanese Laid-Open Patent Application Nos. HEI 10-294186 and HEI 10-294189); and U.S. Pat. No. 5,932,976. Such prior art lighting control devices require many large size components, which makes it difficult to minimize manufacturing costs and minimize the size of the device.

Another problem associated with such prior art lighting control devices relate to an in-rush current that results when a capacitor associated with a boost converter is initially connected to an electrical power source. Specifically, when a discharged capacitor is initially connected to a power source, the capacitor behaves like a short-circuit. Thus, a large flow of current (e.g., the in-rush current) occurs, which can damage electrical components. In order to reduce the occurrence of this in-rush current, such prior art devices typically employ an in-rush current protection device (such as, for example, a soft start switch) that limits, for a predetermined period of time, the amount of current that is passed when the electrical power is initially connected to the lighting control device. Unfortunately, the inclusion of the in-rush current protection device further increases the complexity of the circuit design, and further increases the cost of manufacture and size of the lighting control device.

A still further problem associated with the prior art light control devices pertain to a switching loss associated with the employed switching elements. Switching elements that are turned ON/OFF at a high frequency rate lose a significant amount of power for switching, in addition to a conduction loss. The switching loss can be calculated by multiplying the applied current and applied voltage in a transient state (e.g., when the switching element is turned ON/OFF). The switching loss becomes larger as the switching frequency becomes higher. Prior art devices employ a plurality of switching elements that are turned ON/OFF at a high frequency (e.g., several 10's kHz) rate in the lighting state. Because each switching element exhibits a switching loss, the total amount of the switching loss associated with the prior art devices are equal to the sum of the switching loss of each switching element, which becomes fairly large. Due to the large power loss and resultant low circuit efficiency, the prior art devices are unable to operate with a high efficiency, which is necessary to achieve a compact lighting device.

It is noted that in the prior art lighting control devices, such as, for example, U.S. Pat. No. 6,426,597, switching elements associated with a polarity reversing circuit are turned ON and OFF at a high frequency rate in both the non-lighting (e.g., ignition) state and the lighting state. As noted above, switching losses are related to the frequency rate at which the switching elements are operated.

This large switching loss results in a further disadvantage of the prior art lighting control devices. Namely, the large switching loss associated with the prior art switching elements is converted into heat. The temperature of each component of the lighting control device must be maintained below some predetermined critical temperature level. However, when the switching loss is large, the power loss is large. The lost power (which is discharged as heat), increases (raises) the temperature of the components in the lighting control device. While a heat sink may be installed to dissipate the heat, the inclusion of heat sinks further raises manufacturing costs and increases the physical size of the device.

SUMMARY OF INVENTION

In view of the above, the present invention is directed to a compact, low-cost lighting control circuit for a HID lamp that does not require an in-rush current protection device to prevent an in-rush current condition when an electrical power source is initially applied to the lighting control device. Further, only the switching element associated with a power factor improving power converter of the lighting control device of the present invention operates at a high frequency rate in the lighting state. Thus, the present invention exhibits lower switching losses in comparison with prior art lighting control devices, resulting in an increased efficiency of the lighting control device and eliminating the need to employ large heat sinks to dissipate heat.

A discharge lamp lighting control device according to the present invention includes a DC power converter, a power factor improving power converter (PFIPC), a polarity reversing circuit, a starter circuit, and a controller. The DC power converter functions to convert an AC power source to a rectified voltage. The PFIPC includes a switching device, a power factor improver, and a power converter. The power factor improver functions to smooth the rectified voltage by storing energy in a first inductive device and by discharging energy from a second inductive device, in which the two inductive devices are magnetically coupled. The storing and discharging is performed by turning ON and OFF the switching device. The power converter produces a predetermined DC voltage which is converted from the smoothed voltage by energy stored and discharged by a third inductive device in response to the turning ON and OFF of the switching device. The polarity reversing circuit functions to convert the predetermined DC voltage into a square-wave AC voltage that is applied to a lamp, while the starter circuit uses an output of the polarity reversing circuit as a power source to ignite the lamp by applying a high voltage pulse signal to the lamp. A controller is provided to control the PFIPC and the polarity reversing circuit.

The power factor improver of the present invention further includes a first capacitive device that functions to smooth the DC voltage converted from the AC power source. The power converter also includes a second capacitive device that enables a stable lighting of the lamp. The power factor improver stores electrical energy in the first inductive device when the switching device is ON. The first capacitive device is charged, via the second inductive device, with electrical energy stored in the first inductive device when the switching device is OFF.

The power converter of the present invention additionally includes a third inductive device for storing electrical energy, with energy stored in the first capacitive device, when the switching device is turned ON, and charges the second capacitive device with energy stored in the third inductive device when the switching device is turned OFF.

According to the present invention, the power factor improver includes a first inductive device, a first diode, and a circuit. A first terminal of the first inductive device is electrically connected to a positive polarity side of an input power source. A cathode of the first diode is electrically connected to a remaining terminal of the first inductive device. The circuit includes the second inductive device, in which a first terminal is electrically connected to an anode of the first diode, the second inductive device being magnetically coupled to the first inductive device, a second diode having a cathode that is electrically connected to a remaining terminal of the second inductive device, and a first capacitive device electrically connected parallel to a series circuit formed by the second inductive device and the second diode.

The power converter of the present invention includes a third diode having an anode that is electrically connected to an anode of the second diode, a second capacitive device having a first terminal that is electrically connected to a cathode of the third diode, and a third inductive device that is electrically connected between a remaining terminal of the second capacitive device and the anode of the third diode, with a junction of the second capacitive device and the third inductive device being electrically connected to a negative polarity side of the input power source. The switching device of the present invention is provided between a junction of the first inductive device and the first diode, and the negative polarity side of the input power source. It is noted that a fourth diode may be provided, in which its cathode is electrically connected to a junction of the first diode and the first capacitive device, and its anode is electrically connected to the negative polarity side of the input power source.

According to the present invention, the switching device comprises a single switch element. Alternatively, the switching device may comprise a first switch element and a second switch element. In this situation, the first switch element is electrically connected to the first inductive device, and the second switch element is electrically connected to the second inductive device. The first switch element and the second switch element may be simultaneously turned ON and OFF by the controller.

The turning ON and turning OFF of the switching device in the present invention is controlled so that a first current associated with the first inductive device has a first time period in which the first current equals zero, while a second current associated with the second inductive device has a second time period in which the second current value equals zero. At least a portion of the first time period and at least a portion of the second time period may overlap.

The turning ON and turning OFF of the switching device in the present invention may further be controlled so that a third current, associated with the third inductive device, has a third time period in which the third current value equals zero. In addition, the switching device may be switched at a fixed frequency in order to control a duty ratio according to an output voltage and an output current of the PFIPC. In particular, an ON-time of the switching device may be maintained substantially constant in at least a half period of the AC power source.

The PFIPC of the present invention is controlled to output a constant voltage at a predetermined value when the lamp is not lit. When the lamp is lit, the output of the PFIPC is controlled to be a constant current at a certain value when an output voltage is below the predetermined value, or to output a constant power at a selected value when the output voltage is above the predetermined value.

When the output voltage decreases below a predetermined value in a lighting state of the lamp, a switching frequency of the switching device of the present invention may be lowered so that a current associated with the first inductive device has a time period in which a current value equals zero, and a current associated with the second inductive device has a time period in which the current value equals zero. At least a portion of the time periods associated with the first and second inductive devices may overlap.

The switching device of the present invention may also be controlled so that the turning ON and turning OFF of the switching device is controlled so that a current associated with the third inductive device becomes a continuous current having no time period in which the current value equals zero. By operating the switching device of the present invention at a fixed frequency, a duty ratio of the switching device is controlled according to an output voltage and an output current of the PFIPC.

The output of the starter circuit of the present invention comprises a resonance boosting voltage that is obtained when the polarity reversing circuit applies a square-wave AC voltage having an amplitude of an output voltage of the PFIPC to an inductor-capacitance series resonance circuit.

A discharge lamp lighting control device according to the present invention comprises a power factor improving power converter that includes a switching device utilized to produce a predetermined DC voltage, a polarity reversing circuit that has a plurality of switching elements that are switched ON/OFF to control an operation of a lamp, a starter circuit that functions to ignite the lamp, and a controller that controls the switching device and the plurality of switching elements. According to the present invention, only the switching device of the power factor improving power converter operates at a high frequency rate when the lamp is operating in a lighting state.

A power factor improving power converter of a discharge lamp lighting control device according to the present invention comprises a switching device, a power factor improver, and a power converter. A DC voltage is smoothed by storing energy in a first inductive device and by discharging energy from a second inductive device, with the second inductive device being magnetically coupled to the first inductive device. The storing and discharging of the DC voltage is performed by adjusting an ON-time of the switching device. The power converter produces a predetermined DC output voltage that is converted from the smoothed voltage by energy stored and discharged by a third inductive device in response to the ON-time of the switching device.

BRIEF DESCRIPTION OF THE DRAWINGS

The foregoing and other objects, features and advantages of the invention will be apparent from the following more particular description of preferred embodiments, as illustrated in the accompanying drawings, which are presented as a non-limiting example, in which reference characters refer to the same parts throughout the various views, and wherein.

DETAILED DESCRIPTION OF PREFERRED EMBODIMENTS

Figure 1:
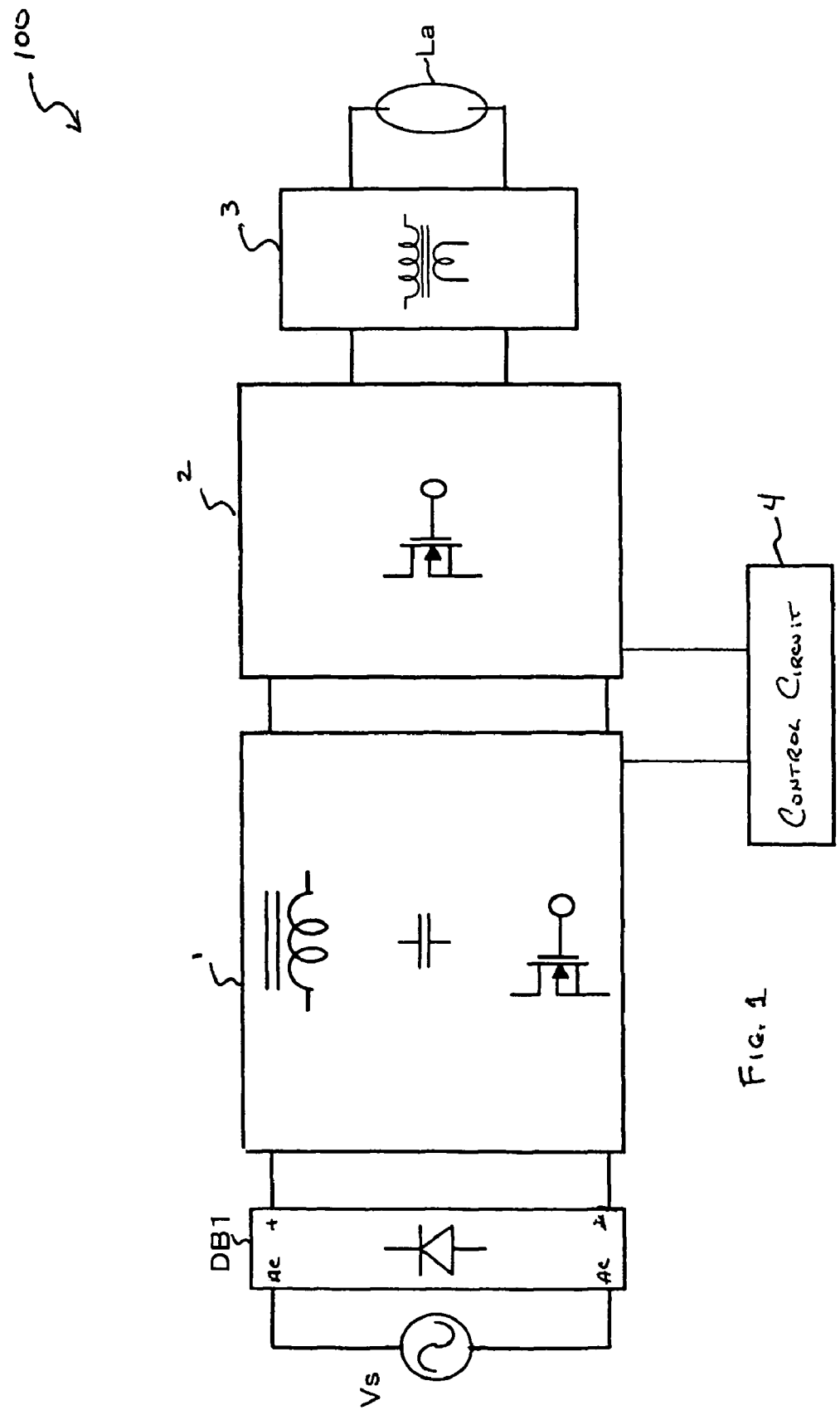
FIG. 1 illustrates a block diagram of a HID lighting control device according to the present invention.
Figure 2:
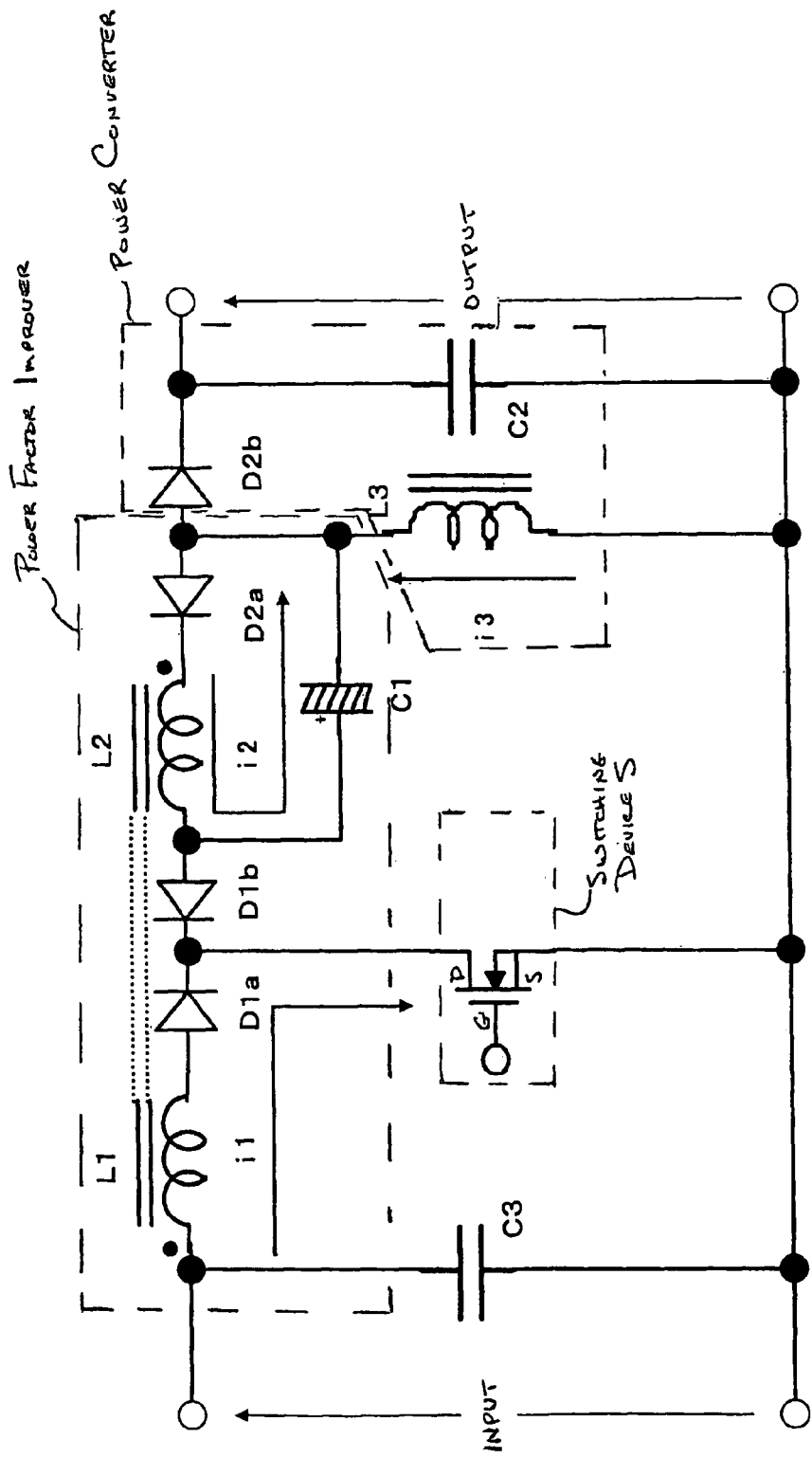
FIG. 2 illustrates a first embodiment of a power factor improving power converter (PFIPC) used with the HID lighting control device of FIG. 1.
Figure 3:
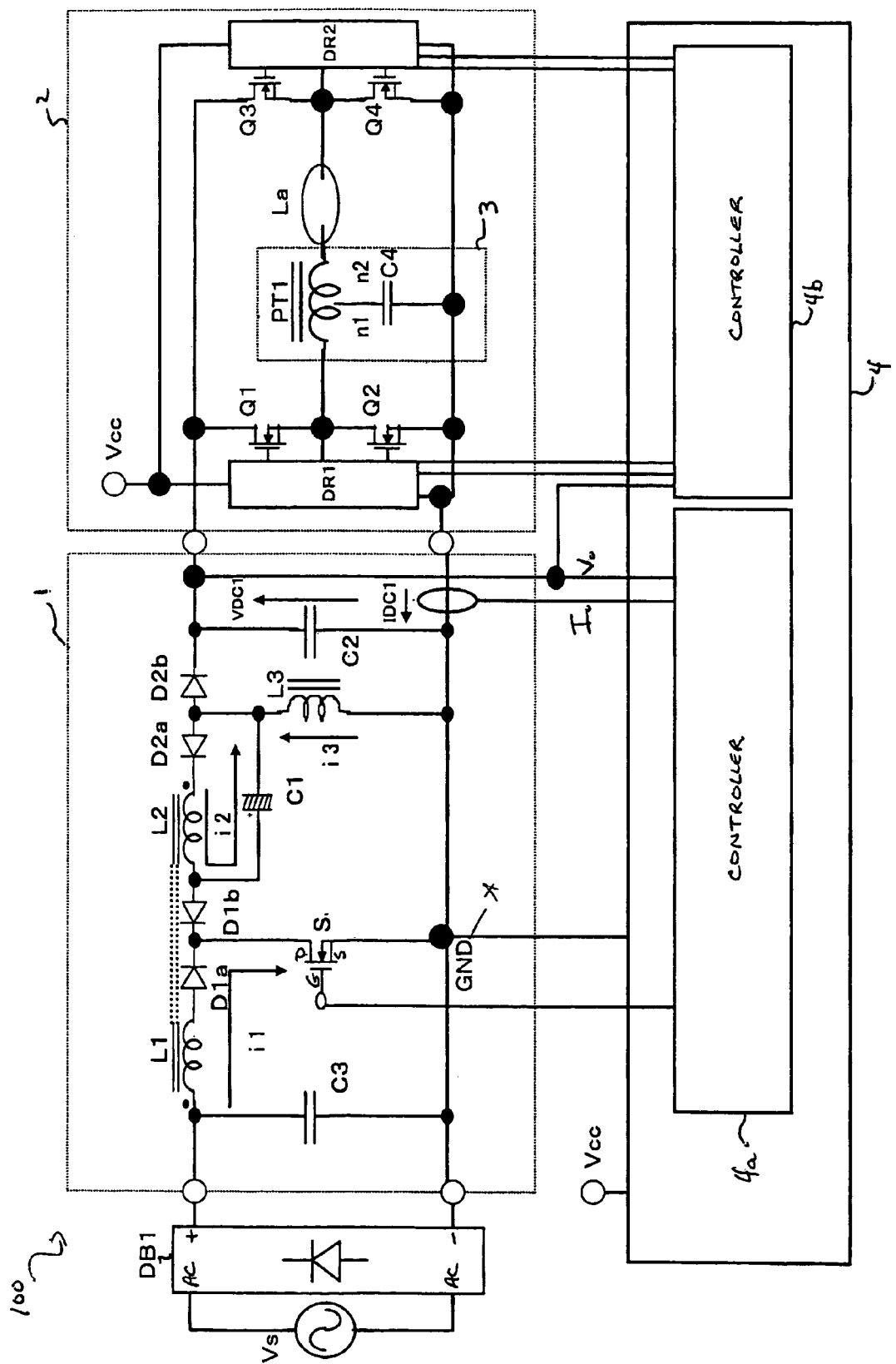
FIG. 3 illustrates a circuit arrangement of the HID lighting control device including the PFIPC of the first embodiment.

A schematic diagram of a High Intensity Discharge (HID) lamp lighting device 100, according to the present invention is shown in FIGS. 1 to 3. The illustrated lighting device comprises a non-isolation type lighting device, in which an input portion and an output portion of the device are not electrically isolated. However, it is understood that the present invention is equally applicable to arrangements in which the input is electrically isolated from the output without departing from the scope and/or spirit of the present invention.

As shown in FIG. 1, the lighting device 100 comprises a bridge rectifier (diode bridge) DB1, a power factor improving power converter (PFIPC) 1, a polarity reversing circuit 2, a starter circuit 3, a HID lamp La, and a control circuit 4.

It is noted that polarity reversing circuits, starter circuits, and control circuits are known in the art (see, for example, the prior art documents noted above), and while the specific circuits may differ in detail herein, the operation of these circuits are similar. Accordingly, a detailed description of these circuits is omitted, unless required for a complete understanding of the PFIPC of the present invention.

The bridge rectifier DB1 includes two AC input terminals, a positive (+) output terminal and a negative (−) output terminal. The two AC terminals are connected to an AC power source Vs, such as, for example, an electrical power line. The bridge rectifier, so named because it comprises four diodes arranged in a bridge, converts the AC power from the power source Vs into a rectified voltage, which is provided at the positive and negative output terminals of the bridge rectifier DB1.

The PFIPC 1 accepts the rectified voltage from the bridge rectifier DB1, and outputs a predetermined DC voltage VDC1, in which the input power factor has been increased, while minimizing the input current distortion. Polarity reversing circuit 2 functions to convert the predetermined output DC voltage VDC1 into a square-wave AC voltage, which is applied to the HID lamp La. The starter circuit 3 takes the output of the polarity reversing circuit 2 and produces a high voltage pulse that is applied to the HID lamp La to start (and restart) the lamp. Controller 4a of the control circuit 4 functions to control the operation of the PFC 1, while controller 4b of the controller 4 functions to control the operation of the polarity reversing circuit 2.

A detailed description of a first embodiment of the present invention will be provided with respect to FIGS. 2 and 3. The PFIPC 1 comprises three inductive elements, such as, but not limited to, for example, inductors L1, L2 and L3, a switching device S, blocking diodes D1a, D1b, D2a and D2b, and two capacitive elements, such as, but not limited to, for example, capacitors C1 and C2. In this regard, while the present invention is described with respect to specific configurations, it is understood that the invention is not limited to the configurations described herein, and that variations thereto may be made without departing from the scope and/or spirit of the invention.

In the first embodiment, a first terminal of first inductor L1 is electrically connected to the positive terminal of the bridge rectifier DB1. A second terminal of the inductor L1 is electrically connected to an anode terminal of the blocking diode D1a. The cathode of the blocking diode D1a is electrically connected to the cathode of blocking diode D1b. The anode of blocking diode D1b is electrically connected to a first terminal of second inductor L2, while a second terminal of the second inductor L2 is electrically connected to the cathode of blocking diode D2a. The anode of blocking diode D2a is electrically connected to the anode of blocking diode D2b. The cathode of blocking diode D2b represents an output of the PFIPC, which is supplied to the polarity reversing circuit 2 (see FIG. 3).

It is noted that inductor L1 and inductor L2 are physically positioned so as to be magnetically coupled to each other. Further, the orientation of the winding direction of the coil associated with each inductor L1 and L2 is as shown in the drawings.

A first terminal of the third inductor L3 is electrically connected to the junction of blocking diodes D2a and D2b, while its second terminal is electrically connected to ground (e.g., the negative terminal of the bridge rectifier DB1, as shown in FIG. 3). The positive terminal of the first capacitor C1 is electrically connected to the junction of the blocking diode D1b and second inductor L2, while the negative terminal of the first capacitor C1 is electrically connected to the junction of the blocking diodes D2a and D2b. In the disclosed embodiment, the first capacitor C1 comprises an electrolytic capacitor. However, other types of capacitors, such as, but not limited to, for example, tantalum type capacitors, may be employed.

One terminal of the second capacitor C2 is electrically connected to the cathode of the blocking diode D2b, while its remaining end is electrically connected to ground. In this regard, the voltage across the terminals (electrodes) of the second capacitor C2 represent the output voltage VDC1 of the PFIPC 1.

Similarly, one terminal of the third capacitor C3 is electrically connected to the first terminal of the inductor L1, while the remaining terminal is electrically connected to ground.

In the disclosed embodiments, the switching device S comprises, for example, a transistor, and in particular, an n-type metal-oxide-semiconductor field-effect-transistor (MOSFET). However, other switching devices may be employed without departing from the scope and/or spirit of the invention. As shown in FIGS. 2 and 3, the Drain of the switching device S is electrically connected to the junction of blocking diodes D1a and D1b. The Substrate and the Source of the switching device S are electrically connected to ground. The Gate of the switching device S is electrically connected to a control ON/OFF signal line of the control circuit 4, to be described below.

The PFIPC 1 actually comprises three sub-sections: a switching section, a power factor improver section, and a power converter section. The switching section is formed by the switching device S. The power factor improver section is formed by the first inductor L1, the blocking diodes D1a and D1b, the second inductor L2, the blocking diode D2a, and the first capacitor C1, The power converter section is formed by the third inductor L3, the blocking diode D2b, and the second capacitor device C2.

The operation of the PFIPC 1 will now be described. As noted above, the bridge rectifier DB1 converts the AC power from the power source Vs into a rectified voltage. When the switching device S is turned ON, electrical energy related to the rectified voltage is stored in the first inductor L1. At approximately the same time, the first capacitor C1 discharges, with the discharged energy being stored in the third inductor L3. When the switching device S is turned OFF, the first capacitor C1 is recharged using the energy that was stored in the first inductor L1, via the second inductor L2. At approximately the same time, the second capacitor C2 is charged using the electrical energy that was stored in the third inductor L3.

When the switching device S is appropriately turned ON/OFF by controller 4a of the control circuit 4 at a high frequency rate (e.g., several 10's kHz to several 100's kHz), a desired DC voltage VDC1 is output. The PFIPC 1 functions to improve the input power factor and control the input current distortion.

As shown in FIG. 3, the polarity reversing circuit 2 includes a plurality of switch devices (elements) Q1, Q2, Q3 and Q4, such as, but not limited to n-type MOSFETs. The arrangement of a polarity reversing circuit is known by those skilled in the art, and thus, a detailed description thereof is omitted herein. When the switching elements are repeatedly turned ON/OFF with a certain time period (e.g., the switching devices are switched at a rate of several 100's Hz), the predetermined voltage VDC1 is converted into a desired square-wave AC voltage having a frequency substantially equal to the certain time period (e.g., several 100's Hz).

Figure 16:
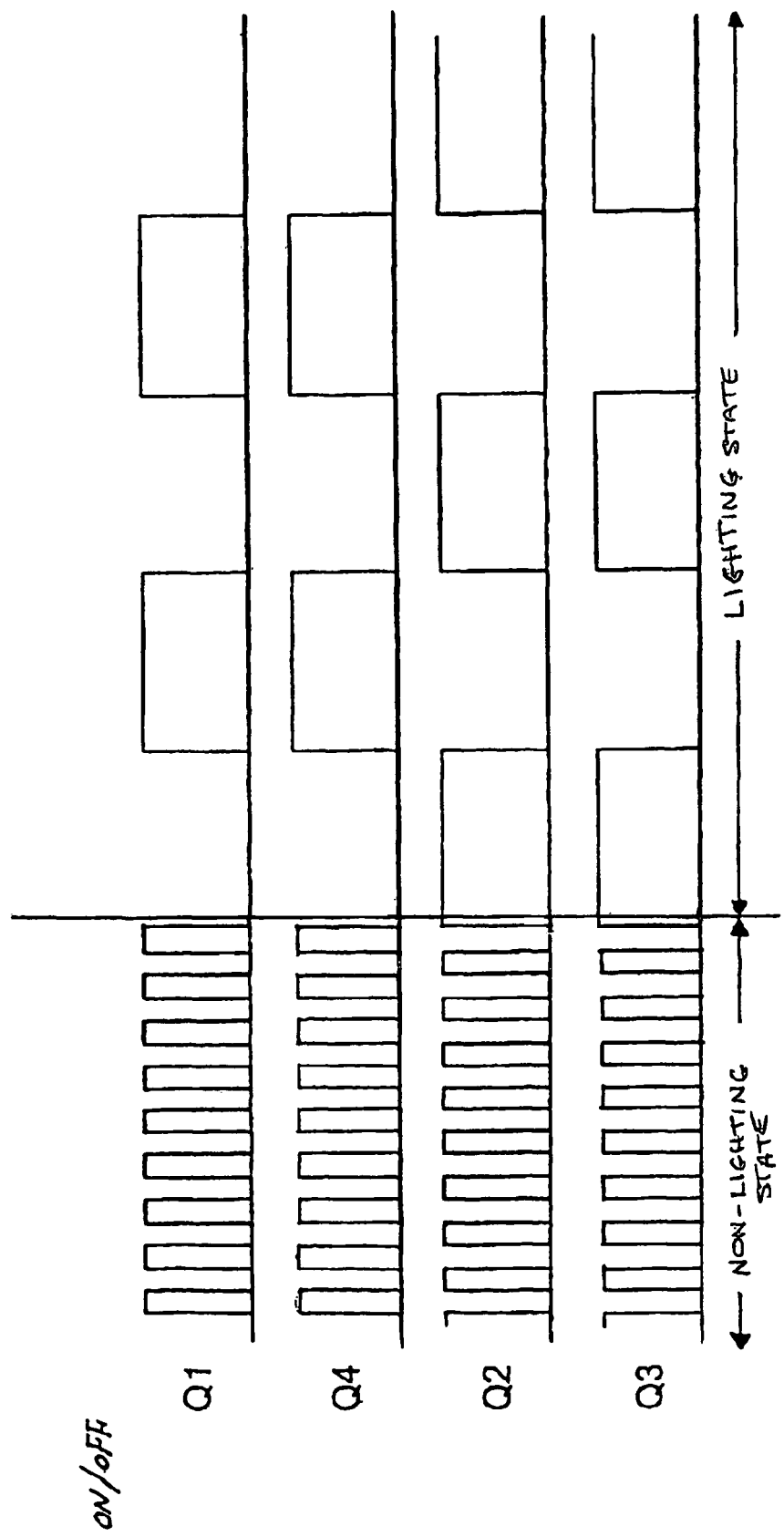
FIG. 16 illustrates the operating condition of the polarity reversing circuit used with the present invention in a non-lighting (e.g., ignition) state, and a lighting state.

FIG. 16 illustrates the operating condition of the switch elements Q1, Q2, Q3 and Q4 of the polarity reversing circuit 2 in the non-lighting (e.g., ignition) state, and the lighting state. When the lamp La is to be ignited (e.g., the non-lighting state), the switch elements Q1 to Q4 are controlled by controller 4b of the control circuit 4 to turn ON/OFF at a high frequency rate of, for example, 10's of kHz to 100's of kHz. Once the lamp La is operating in the lighting state, the controller 4b instructs (controls) the switch elements Q1 to Q4 to turn ON/OFF at a lower frequency rate, such as, for example, 100's Hz. Thus, the switching elements Q1 to Q4 of the polarity reversing circuit 2 do not operate at a high frequency rate during the lighting state. As a result, only the switching device S of the PFIPC 1 of the lighting control device of the present invention operates at a high frequency rate when the lamp La is in the lighting state.

The output voltage and output current from the PFIPC 1 are related to the voltage and current across the lamp La in the lighting state, and are thus easily detectable. The control circuit 4 is electrically connected to the output and ground of the PFIPC 1 to detect the voltage associated with the lamp La, in order to control the ON-time operation of the switching device S for an appropriate lighting of the lamp La, based on the detected output voltage and the detected current IDC1. The control circuit 4 detects current IDC1 using a register or current transformer.

As noted above, the disclosed embodiment employs a single switching device S that is turned ON/OFF at a high frequency (e.g., several 10's kHz to several 100's kHz) rate when the lamp La is operating in the lighting state. The repeated turning ON/OFF of the switching device results in a certain amount of switching loss. Since the present invention employs only a single switching device, the total amount of the switching loss (resulting from the switching device being turned ON/OFF at a high frequency rate) associated with the lighting device 100 of the present invention is less than the prior art devices. Thus, the lighting device 100 of the present invention operates with a greater efficiency. Further, the increased efficiency means less energy is wasted in the form of heat. Accordingly, the switching device S of the PFIPC 1 requires a smaller heat sink (or no heat sink) in comparison with the prior art lighting control devices, resulting in a more compact and less costly lighting control device.

When switching device S of the PFIPC 1 is turned ON, the voltage rectified by the bridge rectifier DB1 is used as the power source, and a current i1 is generated. The energy related to the rectified voltage is stored in inductor L1. At approximately the same time, energy stored in the first capacitor C1 is dissipated, which is stored in the third inductor L3.

When the switching device S is turned OFF, the first capacitor C1 is recharged using the energy that was stored in the first inductor L1 (via the magnetic coupling of the two inductors L1 and L2). As a result, a current i2 flows from the second inductor L2 to the first capacitor C1. At approximately the same time, the second capacitor C2 is charged using the electrical energy that was stored in the third inductor L3. During this time, current i3 flows from the third inductor L3 to the second capacitor C2.

The capacitance of the first capacitor C1 is selected to smooth the full-wave rectified voltage obtained from the rectification of the AC power source Vs by the bridge rectifier DB1. It is also noted that the voltage across the electrodes of the second capacitor C2 substantially corresponds to the output of the PFIPC 1.

When the switching device S is turned (switched) ON/OFF by the controller 4a at a high frequency rate (e.g., several 10's kHz to several 100's kHz), the desired predetermined DC voltage VDC1 is output. The control ON/OFF signal (duty ratio "d", shown in FIG. 17) provided by the controller 4a of the control circuit 4 to the Gate of the switching device S has a fixed frequency. The duration of time that the switching device S is ON (referred to as the ON-time) is constant at least during a half period of the AC power source Vs.

Figure 4:
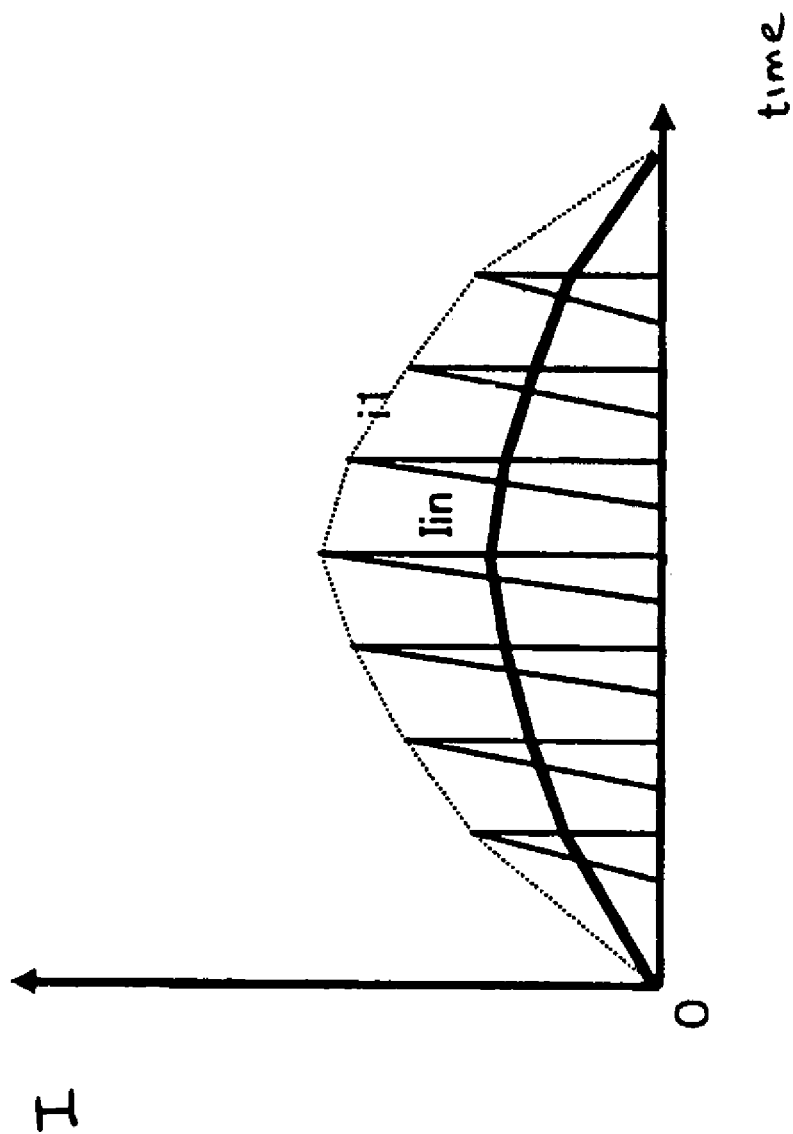
FIG. 4 conceptually illustrates a current i1 associated with the PFIPC during a predetermined time period.

When the switching device S is turned ON, current i1 rises from 0 (see FIG. 4). Since the ON-time of the switching device S is constant, and the current i1 rises from 0, the peak of the current i1 varies according to the AC power source Vs, and simulates an approximate sine-waveform.

FIG. 4 represents a conceptual illustration of the current i1 during the half period of the AC power supply Vs. The current i1 is smoothed by the third capacitor C3. As shown in FIG. 4, the input current Iin of the PFIPC 1 has an approximate sine-wave shape, which shape is approximately the same as the phase of the AC power source Vs. This indicates that the PFIPC 1 of the instant invention exhibits a good input power factor, and that an input current distortion is controlled.

Figure 6:
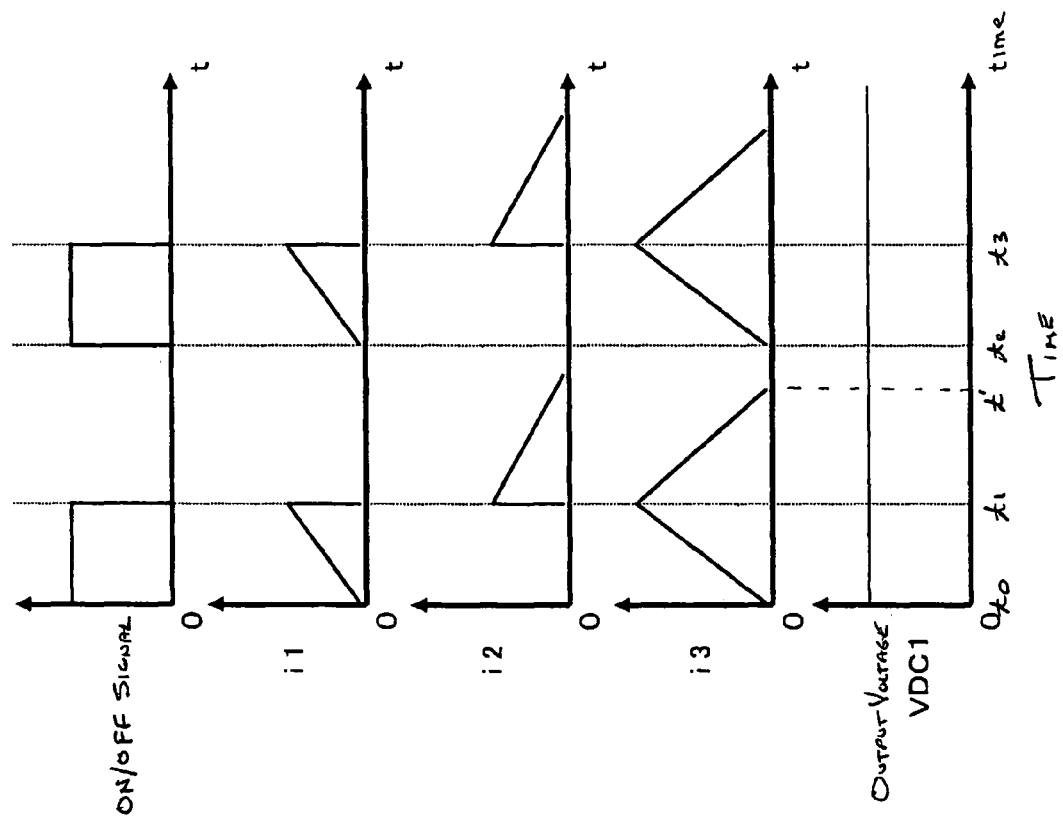
FIG. 6 illustrates waveforms associated with various sections of the PFIPC of the present invention.

When the switching element S is turned ON, current i3 rises from 0 (see FIG. 6). In other words, the current i3 has a pause period (depicted by the period between times t' and t2 in FIG. 6). The inductance of the first, second and third inductors L1, L2 and L3 are preferably selected such that the energy that is charged in the first capacitor C1 (Pin) substantially equals the energy that is discharged (dissipated) from the first capacitor C1(Pout). Therefore, the first capacitor C1 exhibits a substantially constant predetermined voltage VC1.

The following equations are used for selecting the values of each inductor L1, L2 and L3:

$$L1=(Vp^2 \cdot D^2)/(4 \cdot P \cdot fs);$$

$$L2=(Vp^2 \cdot D^2)/(4 \cdot P \cdot fs);$$

$$L3_{max}=(R_{min} \cdot (1-D)^2)/(2 \cdot fs);$$

$$L3_{min}=(D/(1-D))^2 \cdot (Vp^2 \cdot D^2)/(4 \cdot P \cdot fs); \text{and}$$

$$VC1=(L3/L1)^{1/2} \cdot Vs \text{(which, it is noted, is the same as } (L3/L2)^{1/2} \cdot Vs),$$

where:

L1 and L2 represent an inductance value of the first inductor L1 and the second inductor L2, respectively, $L3_{min}$ represents a minimum inductance value of the third inductor L3, $L3_{max}$ represents a maximum inductance value of the third inductor L3, VC1 represents the voltage across the first capacitor C1, P represents an output power of the PFIPC 1, fs represents the switching frequency of the switching device S, D represents the switching duty cycle of the switching device S, Vp represents the peak voltage of the AC power source Vs, and $R_{min}$ represents a minimum equivalent resistance value of the lamp La.

Using the above equations, one can ensure that the voltage rating for the first capacitor C1 will not exceed the peak voltage of the AC power source Vs. That is, the voltage rating of the first capacitor C1, whose capacitance is selected to smooth the full-wave rectified AC power source Vs, will be lower, in comparison to the voltage rating of a corresponding capacitor associated with a prior art lighting control device. The lower voltage rating of the capacitor permits a smaller sized capacitor to be utilized with the present invention, which contributes to the compactness of the device. Furthermore, a lower voltage rated capacitor is typically less expensive than a corresponding higher voltage rated capacitor, which further contributes to lowering manufacturing costs.

In addition, the first capacitor C1 is used to maintain a constant power, both for the power charged to the first capacitor C1 (Pin), and the power discharged from the first capacitor C1 (Pout), even when a sudden (instantaneous) change in the impedance of the load connected to the output (e.g., lamp La) occurs.

Figure 5:
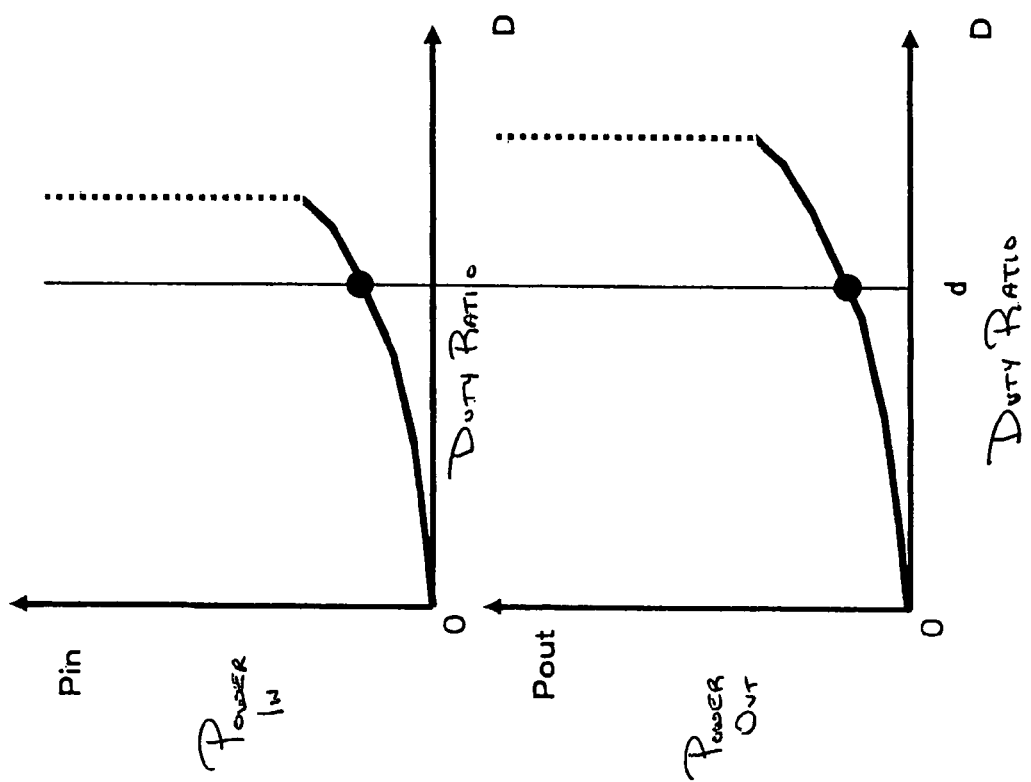
FIG. 5 illustrates relationships of a power charge state and a power discharge state of a storage capacitor used in the PFIPC of the present invention with respect to varying duty ratios.

FIG. 5 illustrates the relationship of the duty ratio during the ON-time of the switching device S and the power charged to the first capacitor C1 and the power discharged from the first capacitor C1. As shown in FIG. 5, when the duty ratio is set to a selected duty ratio "d", the charge power Pin equals the discharge power Pout. That is, when the duty ratio is set to "d", a constant power is maintained. Thus, even when the impedance of the load suddenly changes, the charge power Pin and the discharge power Pout maintain a constant power and have an equal value. Therefore, an undesired excess voltage, due to an unbalanced charging/discharging of the first capacitor C1, will not be generated. Thus, a capacitor having a lower rated voltage can be used, further contributing to the compactness and lowered manufacturing cost of the instant invention.

Moreover, the arrangement of the present PFIPC does not provide an electrical path via which a current can directly flow from the input power source into the first capacitor C1. Therefore, when the AC power source Vs is initially applied, an in-rush current is not generated, eliminating the need to include an in-rush current protection device with the instant invention. In addition, when the input voltage is smaller than the voltage VC1 across the electrodes (terminals) of the first capacitor C1, and when the switching element S is switched OFF after being ON, diode D1a prevents the first capacitor C1 from being fed back (discharged) into the input. In this regard, it is noted that if a bridge rectifier DB1 having fast recovery diodes with a small reverse recovery time is used, diode D1a can be eliminated.

FIG. 6 graphically illustrates the relationship of the current flows i1, i2 and i3 with respect to the switching of the switching device S and the predetermined DC voltage VDC1. As shown in the drawing, the output voltage VDC1 remains substantially constant over time "t". The switching device S is in an ON state from time t0 to time t1. During this time period, current flows i1 and i3 increase (ramp up). At time t1, the switching device S is changed to an OFF state, and the current flows i2 and i3 decrease (ramp down).

Figure 17:
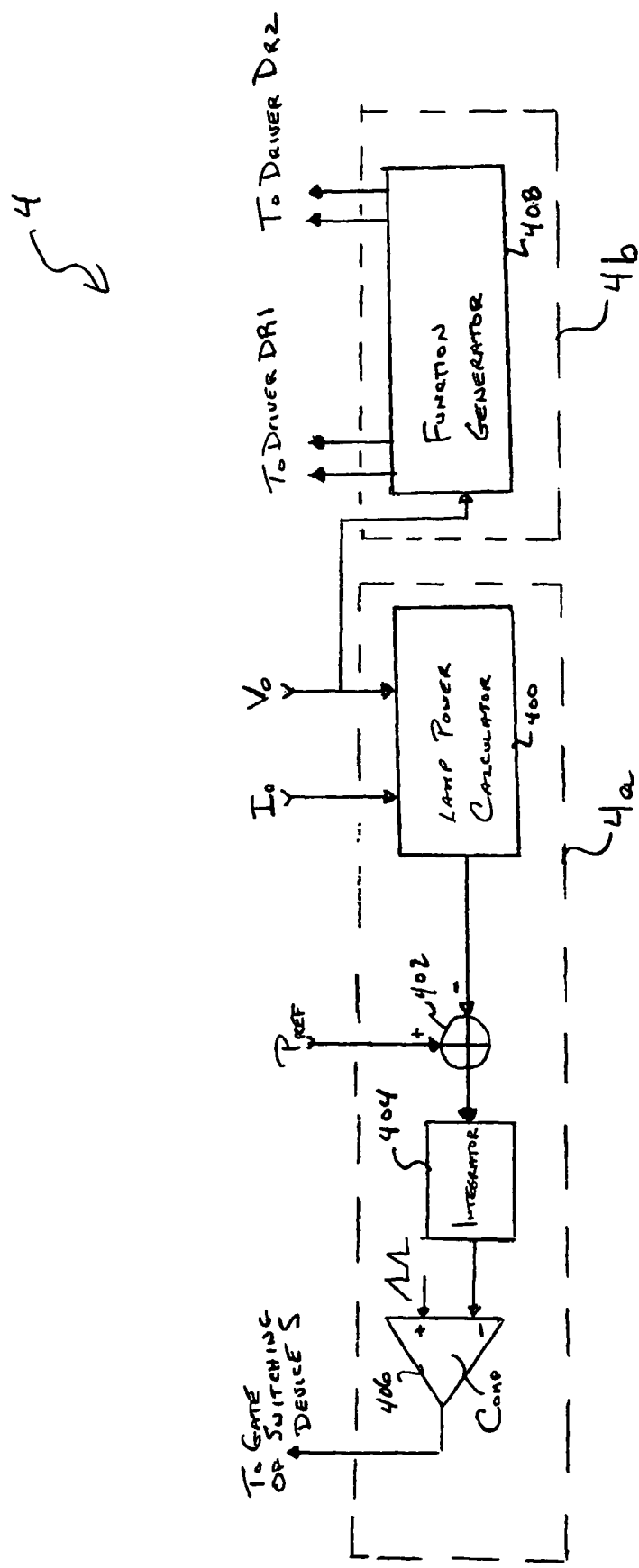
FIG. 17 illustrates an example of a controller used with the lighting control device of the present invention.

A brief discussion will now be presented with respect to the controller 4. FIG. 17 illustrates an example of a controller 4 used with the present invention. It is noted that the following discussion is presented with respect to one example of a controller, and that many controllers are useable with discharge lamp lighting control devices. Accordingly, the following discussion is merely representative of the operations performed by the disclosed example of a controller useable with the present invention. It is understood that alternative controllers may be utilized with the present invention without departing from the scope and/or spirit of the invention.

The control circuit 4 of FIG. 17 comprises controller 4a that is used to control the ON-time of the switching device S of the PFIPC 1, and controller 4b that is used to control the ON/OFF switching of switch elements Q1 to Q4 of the polarity reversing circuit 2.

Controller 4a is electrically connected to the VDC1 output line of the PFIPC 1 to detect a voltage Vo. The controller 4a is also inductively coupled to ground to detect a current Io. The detected voltage Vo and detected current Io are used by a lamp power calculator 400 to determine a lamp power signal W of the lamp La in accordance with the following formula:

$$W=((Ki \cdot Io) \cdot (Kv \cdot Vo))/10,$$

where,

W equals the lamp power signal,

Ki equals a current sensing gain (e.g., a predetermined multiplication factor),

Io equals the detected current,
Kv equals a voltage sense gain (e.g., a certain multiplication factor), and
Vo equals the detected voltage.

Based on the above formula, the lamp power signal W is obtained by multiplying the DC output voltage by the output current of the PFIPC 1. Adder 402 combines the obtained lamp power signal W with a value representing a target power level Pref (e.g., a desired power level of the lamp La) to produce a result that is inputted to a proportional integrator 404. The proportional integrator integrates the inputted signal to produce an error signal that is supplied to an inverting input of a pulse width modulation (PWM) comparator 406.

The PWM comparator 406 compares the error signal to a reference signal inputted to the non-inverting input of the PWM comparator 406 to produce the signal having the duty ratio "d" for the switching device S of the PFIPC 1.

The detected voltage Vo is also inputted to a function generator 408 of controller 4b. The function generator produces appropriate control signals that are supplied to driver DR1 and driver DR2 to control the ON/OFF switching of the switch elements Q1 to Q4.

As noted above, during the igniting (e.g., the non-lighting state) of the lamp La, the controller 4b controls the polarity reversing circuit 2 and starter circuit 3 to operate at the high frequency (e.g., several 10's kHz to several 100's kHz) rate. Further, the duty ratio "d" supplied to the single switching device S by the controller 4a is such that the switching device S is also turned ON/OFF at the high frequency rate. In this regard, it is noted that the high frequency rate applicable to the switching device S may or may not be the same as the high frequency rate applicable to the switching elements Q1 to Q4.

Once the lamp La is in a steady state (e.g., the lighting state), the controller 4b controls the switching elements Q1 to Q4 of the polarity reversing circuit 2 to operate at the lower frequency (e.g., 100's Hz) rate. However, the controller 4a continues to control the switching device S to operate at the high frequency rate. Thus, only the switching device S of the PFIPC 1 associated with the lighting control device 10 operates at a high frequency rate when the lamp La is in the lighting state.

Figure 7:
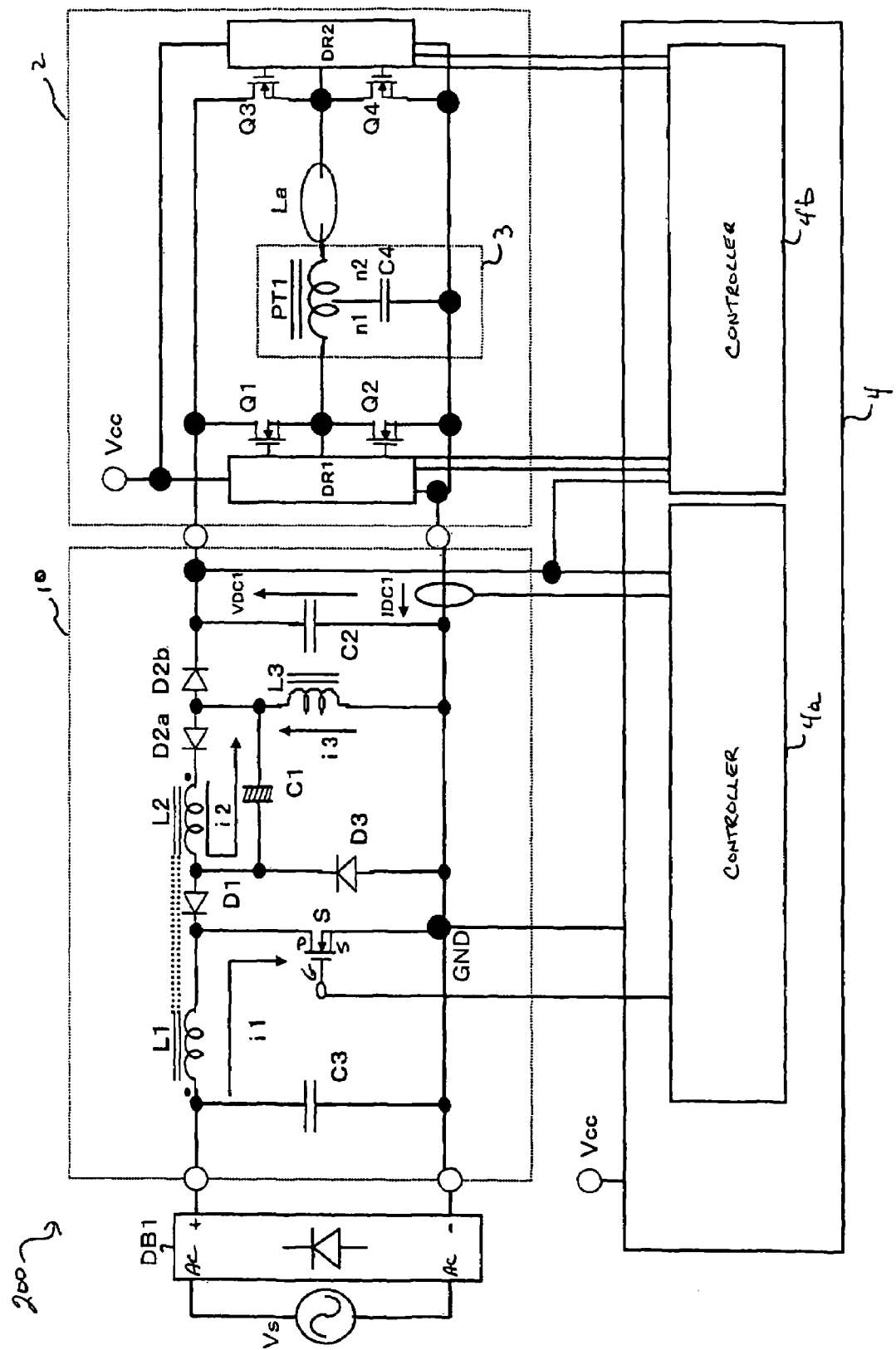
FIG. 7 illustrates a circuit arrangement of a second embodiment of a PFIPC used with a HID lamp.

FIG. 7 illustrates a circuit for a HID lamp lighting device 200 according to a second embodiment of the present invention. For the purpose of clarity, like kind elements are assigned the same reference numerals as depicted in the first embodiment. Power factor improving power converter (PFIPC) 10 differs from the PFIPC 1 of the first embodiment as follows: blocking diodes D1a and D1b from the first embodiment are replaced by a single blocking diode D1 in the second embodiment. The cathode of the blocking diode D1 is electrically connected to the junction of the Drain (of the switching device S) and the first inductor L1. The anode of the blocking diode D1 is electrically connected to the junction of the second inductor L2 and the first capacitor C1. In addition, an additional blocking diode D3 is included, in which the cathode is electrically connected to the anode of the blocking diode D1, while the anode of blocking diode D3 is electrically connected to ground.

It is noted that the polarity reversing circuit 2, starter circuit 3 and control circuit 4 of the second embodiment correspond to the polarity reversing circuit 2, starter circuit 3 and control circuit 4 described with respect to the first embodiment. Accordingly, a discussion of these circuits is omitted from the discussion of the second embodiment.

Figure 8:
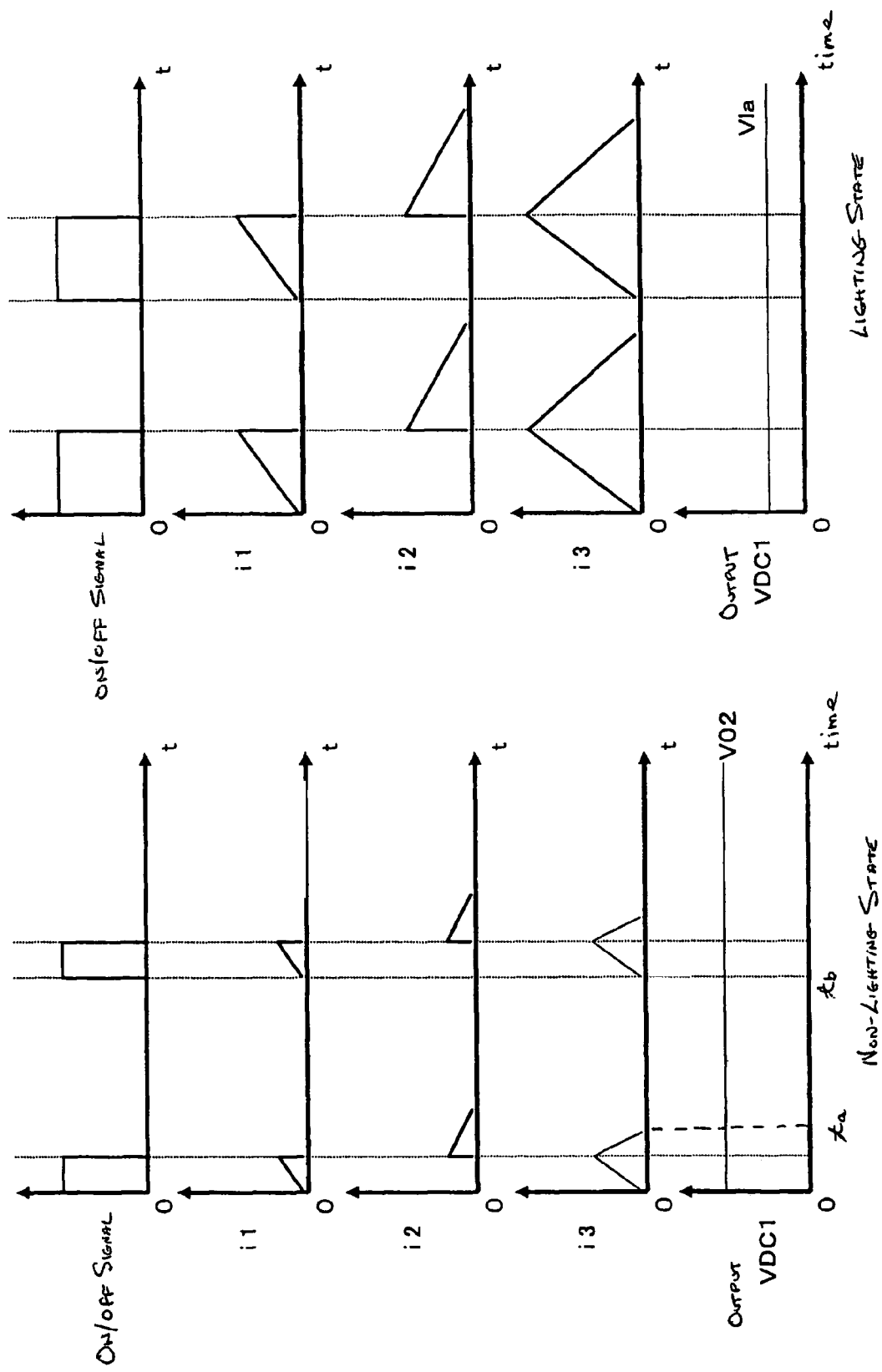
FIGS. 8A and 8B illustrate waveforms of various portions of the PFIPC of FIG. 7.

FIGS. 8A and 8B graphically illustrate the current flows i1, i2 and i3 and output voltage VDC1 in the PFIPC 10 during a non-lighting state and the lighting state, respectively. The basic operation of the PFIPC 10 is similar to the operation of the PFIPC 1 of the first embodiment, with control circuit 4a detecting the output voltage VDC1 and output current IDC1, in order to control the ON-time of the switching device S, in order to achieve a desired output.

As shown in FIG. 8A, when the lamp La is in the non-lighting state, having a high impedance, the switching device S is controlled such that the output voltage VDC1 corresponds to constant output voltage V02. The ON-time of the switching device S is short, and is sometimes 0. When the lamp La is in the lighting state, as shown in FIG. 8B, the ON-time of the switching device S is lengthened, so that the output voltage VDC1 is approximately equal to the lamp voltage V1a.

Figure 9:
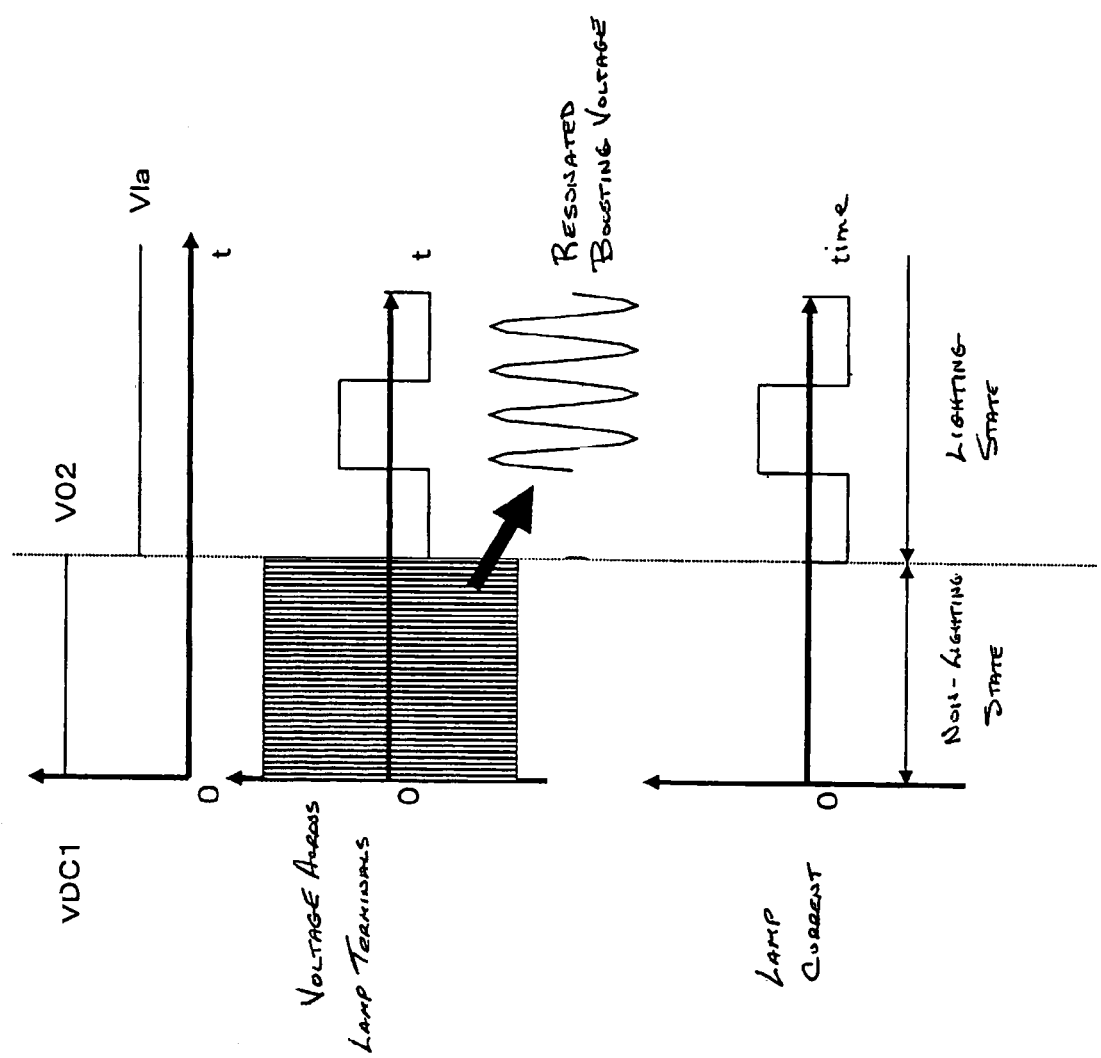
FIG. 9 illustrates the voltage and current across the terminals of a lamp used with the present invention during a non-lighting (ignition) state and a lighting (operating) state.

The following description, which is provided with reference to FIG. 9, illustrates an operation of the HID lamp lighting device of the second embodiment from the time the AC power source Vs is applied to the bridge rectifier DB1, until the time that the lamp La is lit (e.g., in the lighting state).

When the AC power source Vs is applied, the lamp La is in the non-lighting state (e.g., the lamp La is not lit). The PFIPC 10 thus outputs the constant voltage V02 as the output voltage VDC1. With the lamp La being in the non-lighting state, the polarity reversing circuit 2, which is controlled by control circuit 4b, repeatedly alternates the switching device pair Q1 and Q4 ON and the switching device pair Q2 and Q3 ON at a first predetermined frequency f0 (approximately equal to several 100's kHz). In the disclosed embodiments, the first predetermined frequency f0 corresponds to a frequency having a rate that is roughly equal to a resonance frequency fr divided by an arbitrarily selected odd number (e.g., fo=fr/3, or fr/5, or ...). The resonance frequency fr is defined as being approximately equal to a resonance frequency of a series resonance circuit of the starter circuit 3, which is formed by a first winding n1 of transformer PT1 and a fourth capacitor C4. A high voltage sine-wave is generated in the first winding n1, which is boosted (increased) by the turns ratio of the first winding n1 and a second winding n2 of the transformer PT1. This high voltage sine-wave pulse is applied to the lamp La. The application of the high voltage sine-wave pulse to the lamp La causes an ignition of the lamp La, and it is started.

In the disclosed embodiment, voltage V02 is typically set at a voltage above 250V, in order to ease the transition from a glow discharge to an arc discharge, after the lamp La is ignited. However, it is understood that the voltage V02 is selected based upon many factors, including, but not limited to, the characteristics of the lamp La that is employed. Accordingly, the present invention is not limited to the specific voltage setting for voltage V02 disclosed herein, and variations may be made without departing from the scope and/or spirit of the invention. In this regard, it is noted that when the high voltage sine-wave can provide enough energy for the transition from a glow discharge to an arc discharge, the voltage can be set below 250V.

When the lamp La is started (e.g., non-lighting state/igniting state) and goes into the lighting state, the polarity reversing circuit 2, which is controlled by controller 4b of the control circuit 4, repeatedly turns ON switching device Q1 and Q4, and repeatedly turn ON switching devices Q2 and Q3 in an alternating fashion, at a predetermined frequency fa (equal, but not limited to, in the disclosed embodiment, approximately several 100's Hz). Therefore, a square-wave AC voltage having the frequency fa is applied to the lamp La. During this time, the output VDC1 of the PFIPC 10 is approximately equal to the lamp voltage V1a.

When the lamp La is first started (ignited), the impedance of the lamp La is extremely low, and thus, the behavior of the lamp La is more akin to a short-circuit state. As the lamp is ignited (e.g., lighting state), the impedance of the lamp increases, until, after several minutes, the lamp La reaches an impedance for a substantially steady (stable) lighting state.

Figure 10:
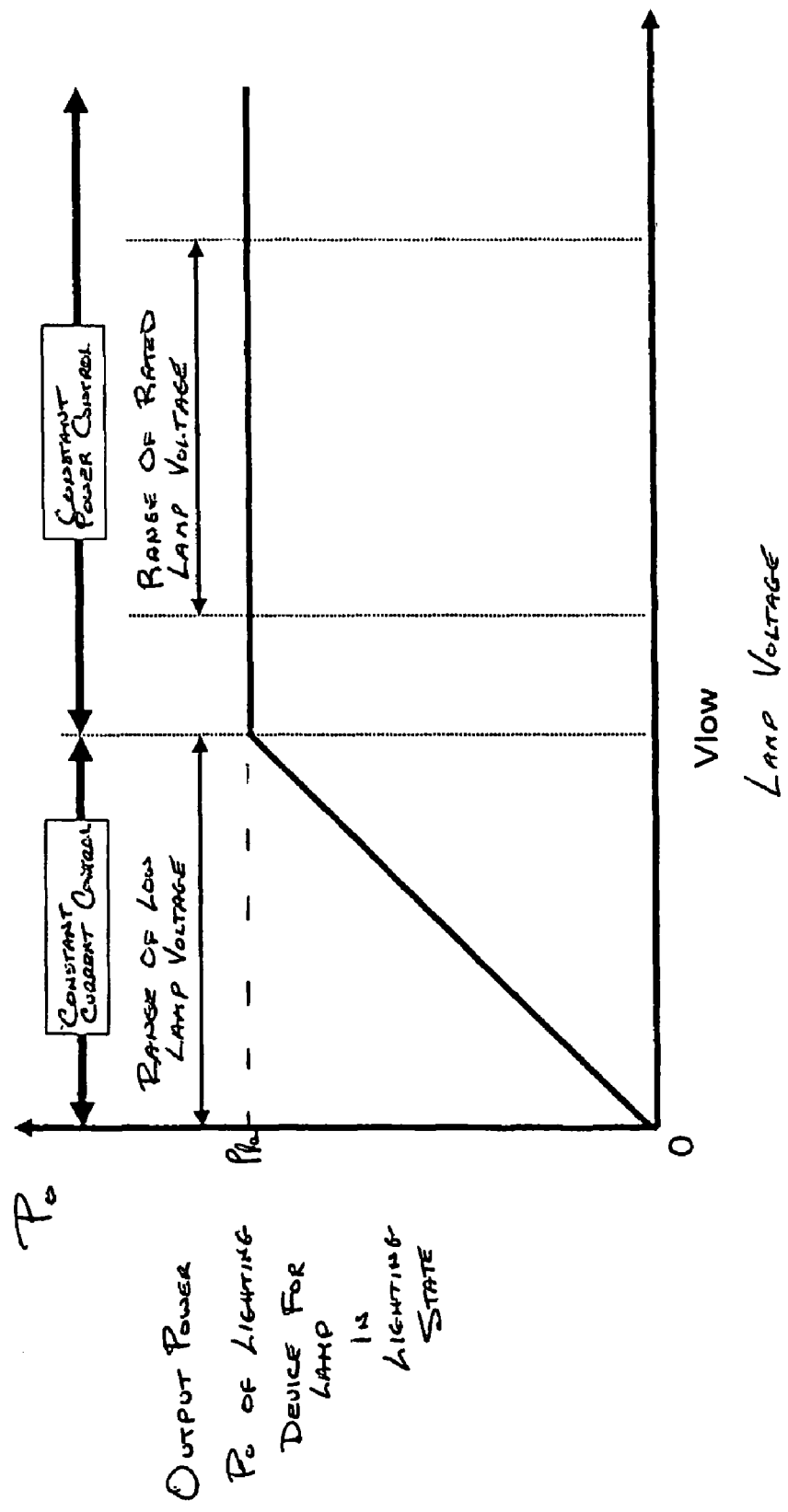
FIG. 10 illustrates output characteristics of the lamp power in the lighting state.

The output characteristics (performance) of the PFIPC 10 in the lighting state is as shown in FIG. 10. In a region where the voltage is below a predetermined lamp voltage Vlow, the ON-time of the switching device S is controlled so that a constant current I02 is output. In the disclosed embodiment, the constant current I02 is generally (but not necessarily) 1.2 to 2.0 times the rated lamp current. In order for the first current i1 to rise from 0 when the switching device S is turned ON, the frequency for turning ON/OFF the switching device S must be decreased as the lamp voltage decreases. Therefore, it is possible to increase the input power factor and control the input current distortion even in the low lamp voltage region. In a region where the voltage is above the predetermined lamp voltage Vlow (e.g., the region including the rated lamp voltage), the ON-time of the switching device S is controlled so that an output power Po maintains a substantially constant power P1a (which approximately equals the rated lamp power).

Accordingly, the present invention achieves a high quality lighting device that can output an approximately constant light in spite of any fluctuation of the lamp voltage.

Figure 11:
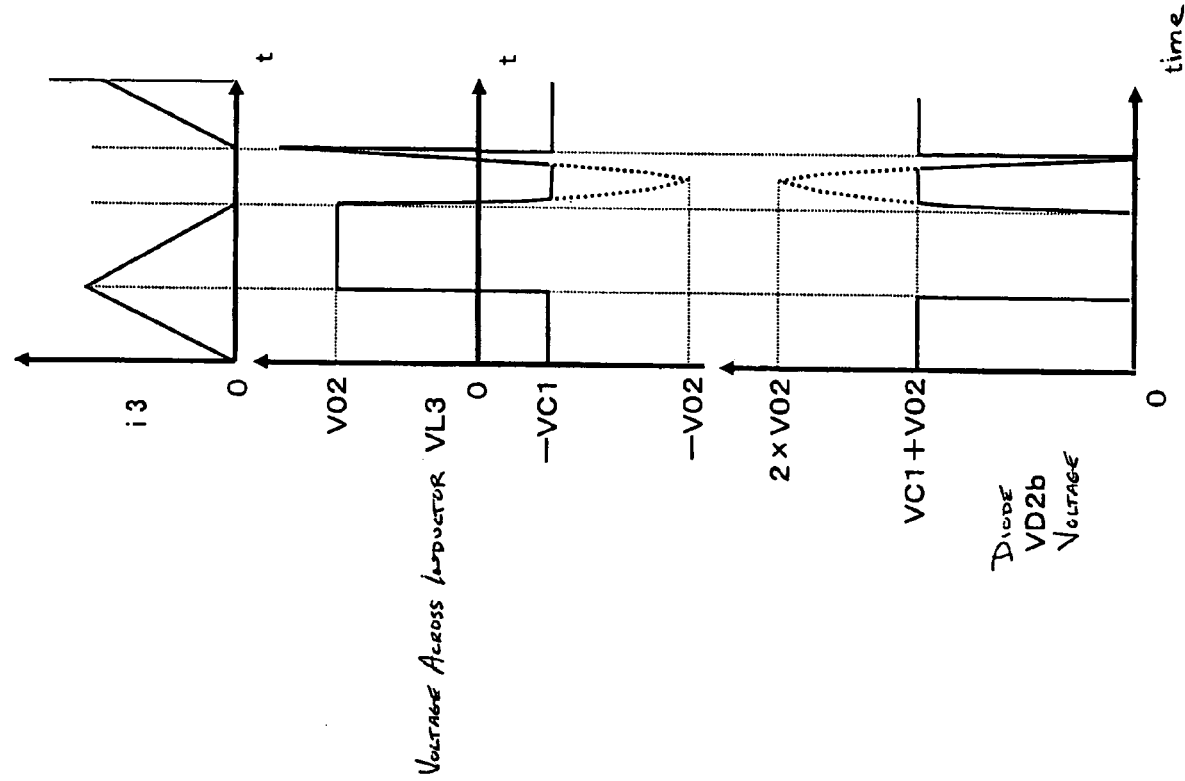
FIG. 11 illustrates a situation in which resonance occurs due to a parasitic capacitance.

The following explains the inclusion of diode D3 in the second embodiment. As shown in FIGS. 8A and 8B, current i3 exhibits a pause period (e.g., a period of time between time ta and time tb during which the current i3 is neither charging nor discharging) in the non-lighting state. As shown in FIG. 11, a resonance is generated at a series resonance circuit comprising the third inductor L3 and a parasitic capacitance of blocking diode D2b during the pause period. As a result, a possibility exists that a voltage VL3 of the third inductor L3 reaches −V02 (shown by the dotted extension of the waveform in FIG. 11). In this case, voltage VD2b at blocking diode D2b will be double the voltage of V02.

In order to avoid the use of electrical components that are rated for this high voltage (e.g., electrical components rated for at least two times the voltage of V02), a clamping device, such as, but not limited to, for example, clamping diode D3, is added to clamp voltage VL3 of the third inductor L3 at −VC1. Accordingly, by employing clamping diode D3, it is possible to use lower voltage rated components, thereby reducing the manufacturing costs and reducing the size of the lighting device.

Figure 12:
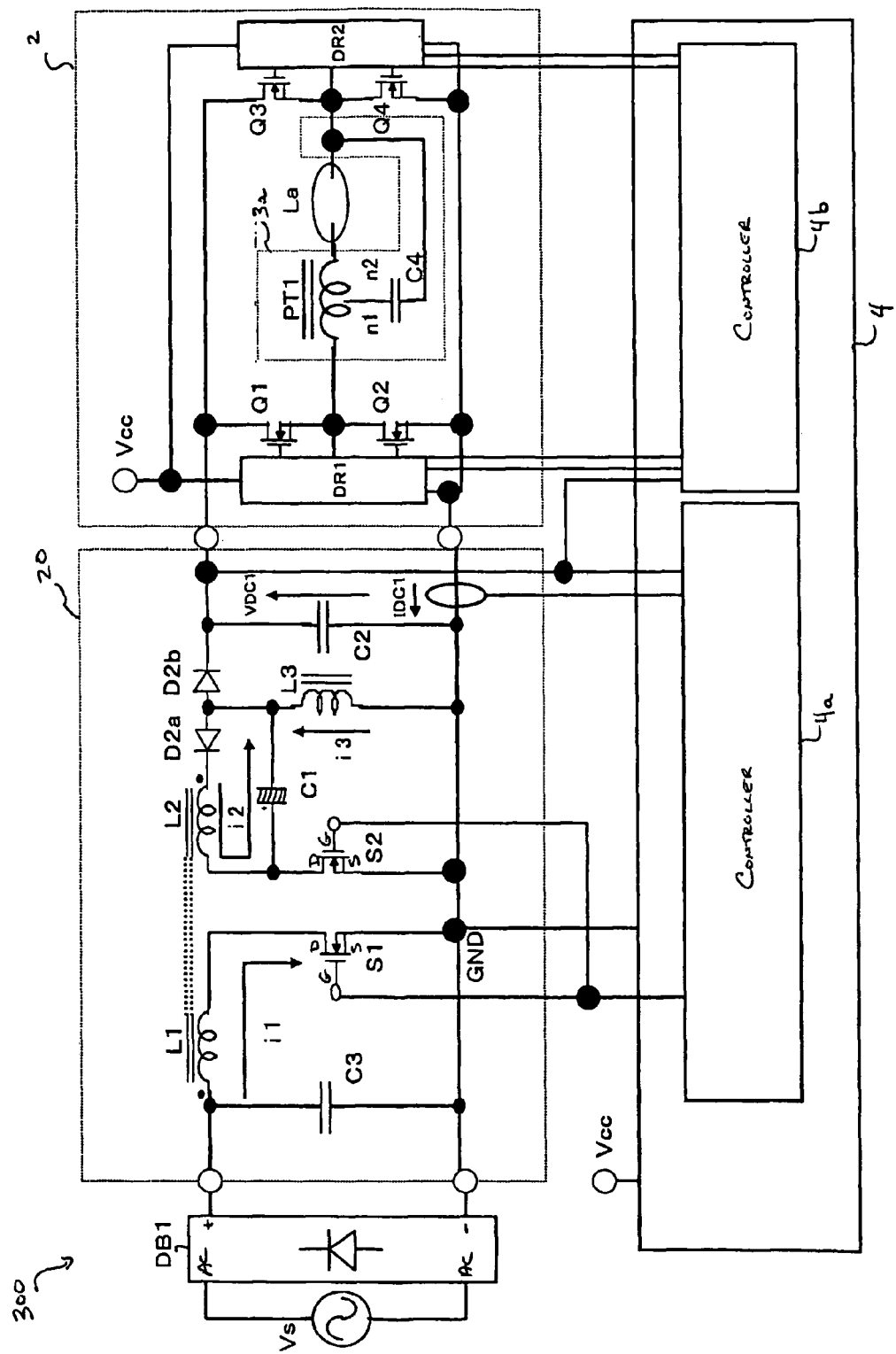
FIG. 12 illustrates a third embodiment of the PFIPC used with a HID lamp.

FIG. 12 illustrates a third embodiment of a HID lamp lighting control device 300 according to the present invention. As with the prior embodiments, like kind elements are assigned the same reference numerals as depicted in the first embodiment.

The third embodiment differs from the first and second embodiments in that the power factor improving power converter (PFIPC) 30 of the third embodiment employs two switching elements S1 and S2 that are simultaneously turned ON/OFF. Other operations and functions in the third embodiment are the same as those of the first and second embodiments.

By employing two switching elements S1 and S2 in the PFIPC 30, diode D1 can be eliminated. Further, in the disclosed embodiment, the switching elements S1 and S2 are MOSFETs, although it is understood that other type switching elements may be used. In particular, the MOSFET employed in the third embodiment for at least the second switching element S2 includes a built-in diode. Accordingly, diode D3 can also be eliminated.

In the third embodiment, a variation of the starter circuit 3 is employed as starter circuit 3a. Specifically, capacitor C4 is arranged to be electrically connected between the junction of windings n1 and n2 (of transformer PT1), and the junction of switching devices Q3 and Q4. In particular, the square-wave voltage having an amplitude of V02 contributes to the resonance in the first embodiment, whereas the square-wave voltage having an amplitude double the V02 contributes to the resonance in the third embodiment. Therefore, a more effective use of the voltage can be achieved, thereby easily generating a desired predetermined high voltage.

Figure 13:
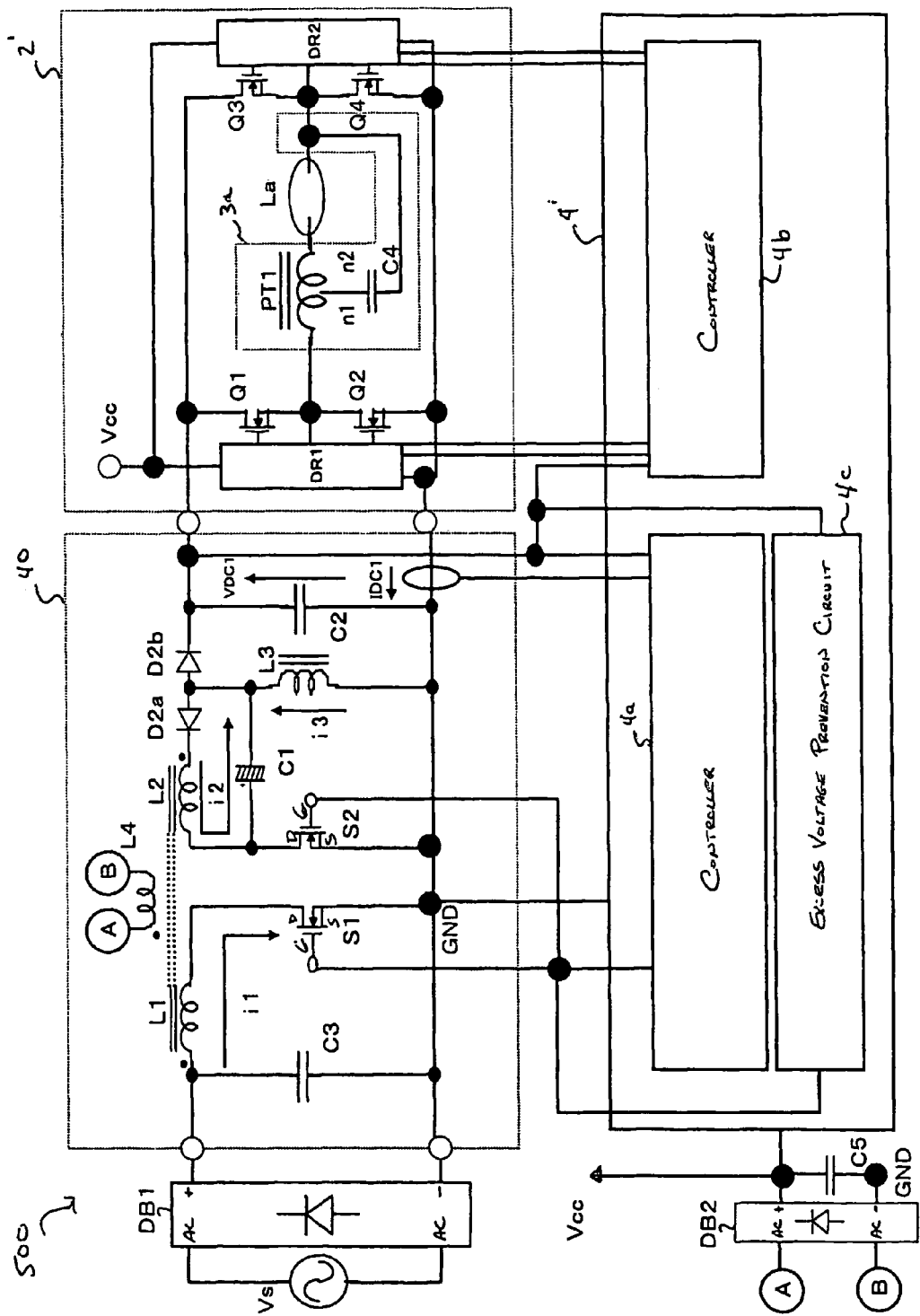
FIG. 13 illustrates a fourth embodiment of the PFIPC used with a HID lamp.

FIG. 13 illustrates a fourth embodiment of a HID lamp lighting control device 500 according to the present invention. As with the prior embodiments, like kind elements are assigned the same reference numerals as depicted in the first embodiment.

Figures 14A, 14B:
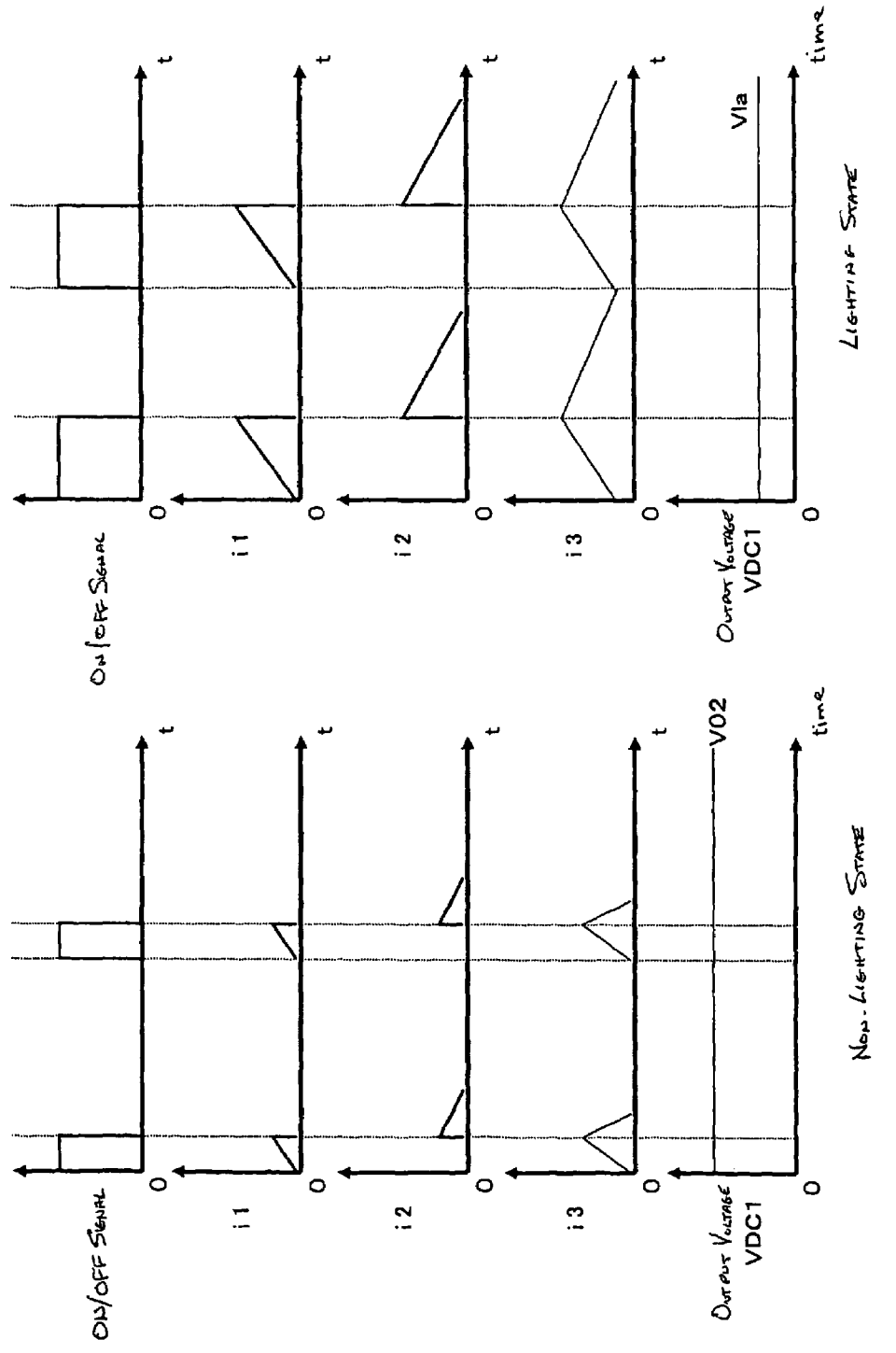
FIGS. 14A and 14B illustrate waveforms of various portions of the PFIPC of FIG. 13 in the non-lighting state and the lighting state, respectively.

The waveforms of the PFIPC 40 in the non-lighting (e.g., ignition) state (see FIG. 14A) correspond to the waveforms of the PFIPC 1 of the first embodiment in the non-lighting state. However, unlike the third embodiment, current i3 in the fourth embodiment exhibits a continuous waveform having no pause period (see FIG. 14B). Since the peak current value can be decreased, the power loss is minimized, thereby improving the circuit efficiency. Therefore, the requirement of employing bulky heat sinks to maintain the operating temperature of the lighting device within a safe operating range, which has been an obstacle for producing a compact lighting device, is no longer necessary.

Figure 15:
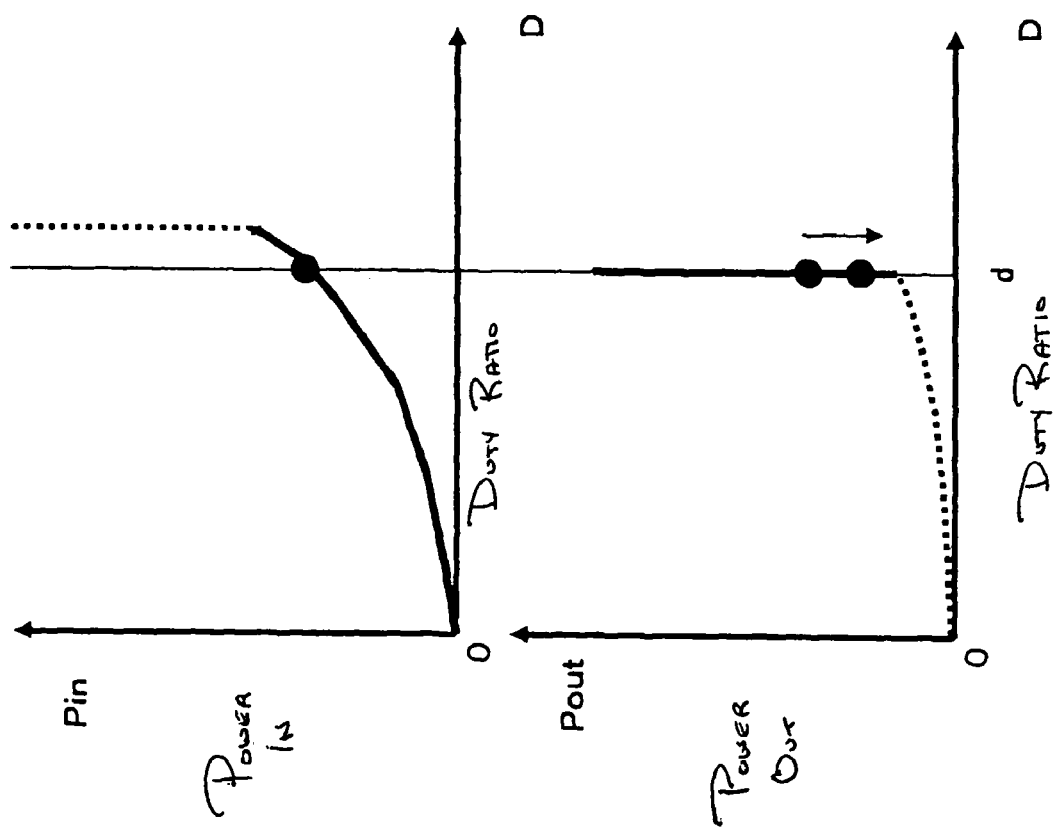
FIG. 15 illustrates relationships of a power charge state and a power discharge state of a storage capacitor used in the PFIPC of the fourth embodiment.

In the fourth embodiment, when current i3 exhibits a continuous waveform (e.g., the waveform has no pause period), the power charged to the first capacitor C1 (Pin) and the power discharged from the first capacitor C1 (Pout), for an instantaneous change of the impedance of the load (connected to the output), under a certain condition, are as shown in FIG. 15.

The power charged to the first capacitor C1 (Pin) for the instantaneous change of the impedance of the load (connected to the output) under a certain condition, has characteristics that maintain a relatively constant power. However, because the power discharged from the first capacitor C1 (Pout) maintains a fairly constant output voltage, the power discharged from the first capacitor fluctuates depending on the load.

The horizontal axis of FIG. 15 represents a duty ratio D during the ON-time of the switching elements S1 and S2. The lower vertical axis represents the power charged to the first capacitor C1 (Pin) and the upper vertical axis represents the power discharged from the first capacitor C1 (Pout). As shown in FIG. 15, when the duty ratio D is set to a certain value d, the power charged to the first capacitor C1 equals the power discharged from the first capacitor C1.

When the impedance of the load connected to the output is instantaneously changed, the power charged to the first capacitor C1 (Pin) maintains a constant power. However, the power discharged from the first capacitor C1 (Pout) varies in accordance with the load, because the power discharged from the first capacitor C1 (Pout) attempts to maintain a constant voltage output. Due to the imbalanced charging/discharging of power in the first capacitor C1, the possibility exists that an excess voltage will be produced.

Control circuit 4' of the fourth embodiment is a variation of the control circuit 4 discussed above with respect to FIG. 17. In addition to including controllers 4a and 4b, control circuit 4' also includes an excess voltage prevention circuit 4c that functions to detect an excess voltage of VDC1 (due to the voltage raise at the first capacitor C1), and control the ON-time of the switching elements S1 and S2 to suppress the output to be below a safe level. Therefore, the excess voltage is no longer problematic.

Supply voltage Vcc, which represents a power source for the control circuit 4' and drivers DR1 and DR2 (of the polarity reversing circuit 2'), is obtained from a power producing inductive device, such as, but not limited to, for example, fourth inductor L4 that is magnetically coupled to the first and second inductors L1 and L2. The voltage obtained from the fourth inductor L4 is rectified by a second bridge rectifier DB2 and smoothed by a smoothing capacitor C5, in order to obtain a predetermined required voltage Vccr. The predetermined voltage Vccr represents a voltage required for the control circuit 4' and the polarity reversing circuit 2' to operate correctly.

However, when the lamp La is in the non-lighting state (thus exhibiting a high impedance), the switching elements S1 and S2 are controlled such that the output voltage VDC1 is substantially equal to voltage V02. The ON-time of the switching elements S1 and S2 will be short, and may sometimes be equal to 0. Accordingly, there are more periods in which a voltage is not generated by the fourth inductor L4 (e.g., a voltage is not applied to the first and second L1 and L2). During such periods, operating voltage Vcc can become unstable. When the supply voltage Vcc becomes lower than a preset value Vcc1 (e.g., a minimum threshold voltage below which the control circuit 4' and the polarity reversing circuit 2' will not operate), voltage V02 is raised slightly to increase the ON-time of the switching elements S1 and S2. Therefore, the supply voltage Vcc can obtain sufficient energy to reach the predetermined required voltage Vccr from the minimum threshold voltage Vcc1, thereby constantly ensuring that the operating voltage Vcc is within a predetermined range.

That is, if the predetermined required voltage Vccr becomes less than the minimum threshold voltage Vcc1, control circuit 4' will change the ON-time of the switching elements S1 and S2 in order to increase the operating voltage Vcc to become substantially equal to the predetermined required voltage Vccr.

The number of parts required for the lighting device of the fourth embodiment is similar to the number of parts employed in prior art lighting devices. However, the switch loss of the switching elements S1 and S2 in the lighting control device of the fourth embodiment is less than in prior art lighting control devices. The efficiency of the lighting control device of the instant invention is greater than in the prior art lighting control devices, because only one switching element is turned ON/OFF at a high frequency rate in the instant invention. Moreover, a more compact inductor can be provided by raising the switching frequency, without largely affecting the efficiency of the lighting device.

While the invention has been particularly shown and described with reference to the preferred embodiments thereof, it is understood by those skilled in the art that various alterations in form and/or detail may be made without departing from the spirit and/or scope of the invention, as defined by the following claims. Although the invention has been described with reference to the particular means, materials and embodiments, it is to be understood that the invention is not limited to the particulars disclosed herein, but extends to all equivalents within the scope of the claims.

What is claimed is:

1. A discharge lamp lighting control device, comprising:
a DC power converter that converts an AC power source to a rectified voltage;
a power factor improving power converter (PFIPC) having a switching device, a power factor improver, and a power converter, said power factor improver smoothing said rectified voltage by storing energy in a first inductive device and by discharging energy from a second inductive device, said second inductive device being magnetically connected to said first inductive device, said storing and discharging being performed by turning ON and OFF said switching device, said power converter producing a predetermined DC voltage, said predetermined DC voltage being converted from said smoothed voltage by energy stored and discharged by a third inductive device in response to said turning ON and OFF of said switching device;
a polarity reversing circuit that converts said predetermined DC voltage into a square-wave AC voltage that is applied to a lamp;
a starter circuit that uses an output of said polarity reversing circuit as a power source to ignite the lamp by applying a high voltage pulse to the lamp; and
a controller that controls said PFIPC and said polarity reversing circuit.

2. The lighting control device of claim 1, wherein said switching device comprises a single switch element.

3. The lighting control device of claim 1, wherein said switching device comprises a first switch element and a second switch element, said first switch element being electrically connected to said first inductive device, said second switch element being electrically connected to said second inductive device, said first switch element and said second switch element being simultaneously turned ON and OFF by said controller.

4. The lighting control device of claim 1, wherein a turning ON and OFF of said switching device is controlled so that a first current associated with said first inductive device has a first time period in which the first current equals zero, and a second current associated with said second inductive device has a second time period in which the second current value equals zero, at least a portion of said first time period and at least a portion of said second time period overlapping.

5. The lighting control device of claim 1, wherein said power factor improver comprises:
said first inductive device, a first terminal of said first inductive device being electrically connected to a positive polarity side of an input power source;
a first diode having a cathode electrically connected to a remaining terminal of said first inductive device; and
a circuit comprising said second inductive device having a first terminal electrically connected to an anode of said first diode, said second inductive device being magnetically coupled to said first inductive device, a second diode having a cathode electrically connected to a remaining terminal of said second inductive device, and a first capacitive device electrically connected parallel to a series circuit formed by said second inductive device and said second diode; and
wherein said power converter comprises:
a third diode having an anode electrically connected to an anode of said second diode;
a second capacitive device having a first terminal electrically connected to a cathode of said third diode; and
a third inductive device electrically connected between a remaining terminal of said second capacitive device and said anode of said third diode, wherein a junction of said second capacitive device and said third inductive device is electrically connected to a negative polarity side of said input power source; and wherein said switching device is provided between a junction of said first inductive device and said first diode, and said negative polarity side of said input power source.

6. The lighting control device of claim 5, further comprising a fourth diode having a cathode electrically connected to a junction of said first diode and said first capacitive device, an anode of said forth diode being electrically connected to the negative polarity side of said input power source.

7. The lighting control device of claim 1, wherein said PFIPC further comprises a fourth inductive device, magnetically coupled to said first inductive device and said second inductive device, that provides a voltage supply to said controller.

8. The lighting control device of claim 7, wherein a predetermined constant voltage output value of an output voltage of said PFIPC is increased only during a time period in which said voltage supply is below a predetermined value.

9. The lighting control device of claim 1, wherein an output of said starter circuit comprises a resonance boosting voltage.

10. The lighting control device of claim 9, wherein said resonance boosting voltage is obtained when said polarity reversing circuit applies a square-wave AC voltage to an inductor-capacitance (LC) series resonance circuit, said square-wave AC voltage having an amplitude substantially equal to twice an output voltage of said PFIPC.

11. The lighting control device of claim 9, wherein said resonance boosting voltage is obtained when said polarity reversing circuit applies a square-wave AC voltage having an amplitude of an output voltage of said PFIPC to an inductor-capacitance series resonance circuit.

12. The lighting control device of claim 11, wherein said resonance boosting voltage is obtained when a frequency of a square-wave AC voltage is approximated to a value that divides a natural resonance frequency of an inductor-capacitance (LC) series resonance circuit by a predetermined odd number.

13. The lighting control device of claim 1, wherein said power factor improver further comprises a first capacitive device that smooths said rectified voltage converted from the AC power source, and wherein said power converter further comprises a second capacitive device that enables a stable lighting of the lamp.

14. The lighting control device of claim 13, wherein said power factor improver stores electrical energy in said first inductive device when said switching device is ON, and charges said first capacitive device via said second inductive device, with electrical energy stored in said first inductive device when said switching device is OFF.

15. The lighting control device of claim 13, wherein said power converter further comprises a third inductive device that stores electrical energy with energy stored in said first capacitive device when said switching device is ON, and charges said second capacitive device with energy stored in said third inductive device when said switching device is OFF.

16. The lighting control device of claim 15, wherein a turning ON and OFF of said switching device is controlled so that a first current associated with said first inductive device has a first time period in which the first current equals zero, and a second current associated with said second inductive device has a second time period in which the second current value equals zero, at least a portion of said first time period and at least a portion of said second time period overlapping, said turning ON and OFF of said switching device being controlled so that a third current associated with said third inductive device has a third time period in which the third current value equals zero.

17. The lighting control device of claim 16, wherein said switching device is switched at a fixed frequency to control a duty ratio according to an output voltage and an output current of said PFIPC.

18. The lighting control device of claim 16, wherein an ON-time of said switching device is maintained substantially constant during at least a half period of the AC power source.

19. The lighting control device of claim 16, wherein said PFIPC is controlled to output a constant voltage at a predetermined value when the lamp is not lit, and when the lamp is lit, to one of output a constant current at a certain value when an output voltage is below the predetermined value and output a constant power at a selected value when the output voltage is above the predetermined value.

20. The lighting control device of claim 19, wherein a switching frequency of said switching device is lowered so that a current associated with said first inductive device has a first time period in which a current value equals zero, and a current associated with said second inductive device has a second time period in which the current value equals zero, as the output voltage is decreased, when the output voltage is below a predetermined value in a lighting state of the lamp, at least a portion of said first time period and at least a portion of said second time period overlapping.

21. The lighting control device of claim 15, wherein a turning ON and OFF of said switching device is controlled so that a first current associated with said first inductive device has a first time period in which the first current equals zero, and a second current associated with said second inductive device has a second time period in which the second current value equals zero, at least a portion of said first time period and at least a portion of said second time period overlapping, a turning ON and OFF of said switching device being controlled so that a current associated with a third inductive device becomes a continuous current having no time period in which the current value equals zero.

22. The lighting control device of claim 21, wherein said switching device is switched at a fixed frequency to control a duty ratio of said switching device according to an output voltage and an output current of said PFIPC.

23. The lighting control device of claim 21, wherein an ON-time of said switching device is maintained substantially constant during at least a half period of the AC power source.

24. The lighting control device of claim 21, wherein said PFIPC outputs a constant voltage at a predetermined value when the lamp is not lit, and when the lamp is lit, one of outputs a constant current at a certain value when an output voltage is below the predetermined value, and outputs a constant power at a selected value when the output voltage is above the predetermined value.

25. The lighting control device of claim 24, wherein a switching frequency of said switching device is lowered so that a current associated with said first inductive device has a first time period in which the current equals zero, and a current associated with said second inductive device has a second time period in which the current equals zero, as the output voltage is decreased, when the output voltage is below the predetermined value in a lighting state of the lamp, at least a portion of said first time period and at least a portion of said second time period overlapping.

26. A power factor improving power converter of a discharge lamp lighting control device, comprising:
    a switching device;
    a power factor improver; and
    a power converter, a DC voltage being smoothed by storing energy in a first inductive device and by discharging energy from a second inductive device, said second inductive device being magnetically coupled to said first inductive device, said storing and discharging of said DC voltage being performed by adjusting an ON-time of said switching device, said power converter producing a predetermined DC output voltage that is converted from said smoothed voltage by energy stored and discharged by a third inductive device in response to said ON-time of said switching device.

* * * * *